(12) United States Patent
Sivasankar et al.

(10) Patent No.: US 8,568,581 B2
(45) Date of Patent: Oct. 29, 2013

(54) HETEROCYCLE CATALYZED CARBONYLATION AND HYDROFORMYLATION WITH CARBON DIOXIDE

(75) Inventors: Narayanappa Sivasankar, Plainsborough, NJ (US); Emily Barton Cole, Princeton, NJ (US); Kyle Teamey, Washington, DC (US)

(73) Assignee: Liquid Light, Inc., Monmouth Junction, NJ (US)

( * ) Notice: Subject to any disclaimer, the term of this patent is extended or adjusted under 35 U.S.C. 154(b) by 0 days.

(21) Appl. No.: 13/307,980

(22) Filed: Nov. 30, 2011

(65) Prior Publication Data

US 2012/0132537 A1    May 31, 2012

Related U.S. Application Data

(60) Provisional application No. 61/417,956, filed on Nov. 30, 2010, provisional application No. 61/418,054, filed on Nov. 30, 2010.

(51) Int. Cl.
*C25B 3/00* (2006.01)

(52) U.S. Cl.
USPC ............ 205/413; 205/440; 205/448; 205/450

(58) Field of Classification Search
USPC ................... 205/448, 413, 440, 450
See application file for complete search history.

(56) References Cited

U.S. PATENT DOCUMENTS

| | | |
|---|---|---|
| 3,019,256 A | 1/1962 | Dunn |
| 3,399,966 A | 9/1968 | Osamu Suzuki et al. |
| 3,401,100 A | 9/1968 | Macklin |
| 3,560,354 A * | 2/1971 | Young .......................... 205/338 |
| 3,607,962 A | 9/1971 | Krekeler et al. |
| 3,636,159 A * | 1/1972 | Solomon ....................... 568/455 |

(Continued)

FOREIGN PATENT DOCUMENTS

| | | |
|---|---|---|
| AU | 2012202601 A1 | 5/2012 |
| CA | 2604569 A1 | 10/2006 |

(Continued)

OTHER PUBLICATIONS

Jääskeläinen and Haukka, The Use of Carbon Dioxide in Ruthenium Carbonyl Catalyzed 1-hexene Hydroformylation Promoted by Alkali Metal and Alkaline Earth Salts, Applied Catalysis A: General, 247, 95-100 (2003).*

(Continued)

*Primary Examiner* — Luan Van
*Assistant Examiner* — Ho-Sung Chung
(74) *Attorney, Agent, or Firm* — Suiter Swantz pc llo

(57) ABSTRACT

Methods and systems for heterocycle catalyzed carbonylation and hydroformylation with carbon dioxide are disclosed. A method may include, but is not limited to, steps (A) to (D). Step (A) may introduce water to a first compartment of an electrochemical cell. The first compartment may include an anode. Step (B) may introduce carbon dioxide to a second compartment of the electrochemical cell. The second compartment may include a solution of an electrolyte, a heterocyclic catalyst, and a cathode. Step (C) may introduce a second reactant to the second compartment of the electrochemical cell. Step (D) may apply an electrical potential between the anode and the cathode in the electrochemical cell sufficient to induce liquid phase carbonylation or hydroformylation to form a product mixture.

9 Claims, 3 Drawing Sheets

(56) References Cited

U.S. PATENT DOCUMENTS

| | | |
|---|---|---|
| 3,720,591 A | 3/1973 | Skarlos |
| 3,745,180 A | 7/1973 | Rennie |
| 3,779,875 A | 12/1973 | Michelet |
| 3,899,401 A | 8/1975 | Nohee et al. |
| 3,959,094 A | 5/1976 | Steinberg |
| 4,072,583 A | 2/1978 | Hallcher et al. |
| 4,088,682 A | 5/1978 | Jordan |
| 4,160,816 A | 7/1979 | Williams et al. |
| 4,219,392 A | 8/1980 | Halmann |
| 4,343,690 A | 8/1982 | de Nora |
| 4,381,978 A | 5/1983 | Gratzel et al. |
| 4,414,080 A | 11/1983 | Williams et al. |
| 4,439,302 A | 3/1984 | Wrighton et al. |
| 4,450,055 A | 5/1984 | Stafford |
| 4,451,342 A | 5/1984 | Lichtin et al. |
| 4,460,443 A | 7/1984 | Somorjai et al. |
| 4,474,652 A | 10/1984 | Brown et al. |
| 4,476,003 A | 10/1984 | Frank et al. |
| 4,478,694 A | 10/1984 | Weinberg |
| 4,478,699 A | 10/1984 | Halmann et al. |
| 4,595,465 A | 6/1986 | Ang et al. |
| 4,608,132 A | 8/1986 | Sammells |
| 4,608,133 A | 8/1986 | Morduchowitz et al. |
| 4,609,440 A | 9/1986 | Frese, Jr. et al. |
| 4,609,441 A | 9/1986 | Frese, Jr. et al. |
| 4,609,451 A | 9/1986 | Sammells et al. |
| 4,619,743 A | 10/1986 | Cook |
| 4,620,906 A | 11/1986 | Ang |
| 4,668,349 A | 5/1987 | Cuellar et al. |
| 4,673,473 A | 6/1987 | Ang et al. |
| 4,702,973 A | 10/1987 | Marianowski |
| 4,732,655 A | 3/1988 | Morduchowitz et al. |
| 4,756,807 A | 7/1988 | Meyer et al. |
| 4,776,171 A | 10/1988 | Perry, Jr. et al. |
| 4,793,904 A | 12/1988 | Mazanec et al. |
| 4,824,532 A | 4/1989 | Moingeon et al. |
| 4,855,496 A | 8/1989 | Anderson et al. |
| 4,897,167 A | 1/1990 | Cook et al. |
| 4,902,828 A | 2/1990 | Wickenhaeuser et al. |
| 4,921,586 A | 5/1990 | Molter |
| 4,936,966 A | 6/1990 | Garnier et al. |
| 4,945,397 A | 7/1990 | Schuetz |
| 4,959,131 A | 9/1990 | Cook et al. |
| 5,064,733 A | 11/1991 | Krist et al. |
| 5,198,086 A | 3/1993 | Chlanda et al. |
| 5,246,551 A | 9/1993 | Pletcher et al. |
| 5,284,563 A | 2/1994 | Fujihira et al. |
| 5,382,332 A | 1/1995 | Fujihira et al. |
| 5,443,804 A | 8/1995 | Parker et al. |
| 5,514,492 A | 5/1996 | Marincic et al. |
| 5,587,083 A | 12/1996 | Twardowski |
| 5,763,662 A | 6/1998 | Ikariya et al. |
| 5,804,045 A | 9/1998 | Orillon et al. |
| 5,858,240 A | 1/1999 | Twardowski et al. |
| 5,928,806 A | 7/1999 | Olah et al. |
| 6,024,935 A | 2/2000 | Mills et al. |
| 6,187,465 B1 | 2/2001 | Galloway |
| 6,251,256 B1 | 6/2001 | Blay et al. |
| 6,270,649 B1 | 8/2001 | Zeikus et al. |
| 6,409,893 B1 | 6/2002 | Holzbock et al. |
| 6,657,119 B2 | 12/2003 | Lindquist et al. |
| 6,755,947 B2 | 6/2004 | Schulze et al. |
| 6,777,571 B2 | 8/2004 | Chaturvedi et al. |
| 6,806,296 B2 | 10/2004 | Shiroto et al. |
| 6,887,728 B2 | 5/2005 | Miller et al. |
| 6,906,222 B2 | 6/2005 | Slany et al. |
| 6,936,143 B1 | 8/2005 | Graetzel et al. |
| 6,942,767 B1 | 9/2005 | Fazzina et al. |
| 7,037,414 B2 | 5/2006 | Fan |
| 7,052,587 B2 | 5/2006 | Gibson et al. |
| 7,094,329 B2 | 8/2006 | Saha et al. |
| 7,314,544 B2 | 1/2008 | Murphy et al. |
| 7,318,885 B2 | 1/2008 | Omasa |
| 7,338,590 B1 | 3/2008 | Shelnutt et al. |
| 7,361,256 B2 | 4/2008 | Henry et al. |
| 7,378,561 B2 | 5/2008 | Olah et al. |
| 7,704,369 B2 | 4/2010 | Olah et al. |
| 7,883,610 B2 | 2/2011 | Monzyk et al. |
| 8,313,634 B2 | 11/2012 | Bocarsly et al. |
| 2001/0026884 A1 | 10/2001 | Appleby et al. |
| 2003/0029733 A1 | 2/2003 | Otsuka et al. |
| 2004/0089540 A1 | 5/2004 | Van Heuveln et al. |
| 2005/0011755 A1 | 1/2005 | Jovic et al. |
| 2005/0011765 A1 | 1/2005 | Omasa |
| 2005/0051439 A1 | 3/2005 | Jang |
| 2006/0102468 A1 | 5/2006 | Monzyk et al. |
| 2006/0235091 A1 | 10/2006 | Olah et al. |
| 2006/0243587 A1 | 11/2006 | Tulloch et al. |
| 2007/0004023 A1 | 1/2007 | Trachtenberg et al. |
| 2007/0012577 A1 | 1/2007 | Bulan et al. |
| 2007/0045125 A1 | 3/2007 | Hartvigsen et al. |
| 2007/0054170 A1 | 3/2007 | Isenberg |
| 2007/0122705 A1 | 5/2007 | Paulsen et al. |
| 2007/0184309 A1 | 8/2007 | Gust, Jr. et al. |
| 2007/0224479 A1 | 9/2007 | Tadokoro et al. |
| 2007/0231619 A1 | 10/2007 | Strobel et al. |
| 2007/0240978 A1 | 10/2007 | Beckmann et al. |
| 2007/0254969 A1 | 11/2007 | Olah et al. |
| 2007/0282021 A1 | 12/2007 | Campbell |
| 2008/0011604 A1 | 1/2008 | Stevens et al. |
| 2008/0039538 A1 | 2/2008 | Olah et al. |
| 2008/0060947 A1 | 3/2008 | Kitsuka et al. |
| 2008/0072496 A1 | 3/2008 | Yogev et al. |
| 2008/0090132 A1 | 4/2008 | Ivanov et al. |
| 2008/0116080 A1 | 5/2008 | Lal et al. |
| 2008/0145721 A1 | 6/2008 | Shapiro et al. |
| 2008/0223727 A1 | 9/2008 | Oloman et al. |
| 2008/0248350 A1 | 10/2008 | Little et al. |
| 2008/0283411 A1 | 11/2008 | Eastman et al. |
| 2008/0287555 A1 | 11/2008 | Hussain et al. |
| 2008/0296146 A1 | 12/2008 | Toulhoat et al. |
| 2009/0014336 A1 | 1/2009 | Olah et al. |
| 2009/0030240 A1 | 1/2009 | Olah et al. |
| 2009/0038955 A1 | 2/2009 | Rau |
| 2009/0061267 A1 | 3/2009 | Monzyk et al. |
| 2009/0069452 A1 | 3/2009 | Robota |
| 2009/0134007 A1 | 5/2009 | Solis Herrera |
| 2009/0277799 A1 | 11/2009 | Grimes |
| 2010/0084280 A1 | 4/2010 | Gilliam et al. |
| 2010/0147699 A1 | 6/2010 | Wachsman et al. |
| 2010/0150802 A1 | 6/2010 | Gilliam et al. |
| 2010/0180889 A1 | 7/2010 | Monzyk et al. |
| 2010/0187123 A1 | 7/2010 | Bocarsly et al. |
| 2010/0187125 A1 | 7/2010 | Sandoval et al. |
| 2010/0191010 A1 | 7/2010 | Bosman et al. |
| 2010/0193370 A1 | 8/2010 | Olah et al. |
| 2010/0196800 A1 | 8/2010 | Markoski et al. |
| 2010/0213046 A1 | 8/2010 | Grimes et al. |
| 2010/0248042 A1 | 9/2010 | Nakagawa et al. |
| 2010/0307912 A1 | 12/2010 | Zommer |
| 2011/0014100 A1 | 1/2011 | Bara et al. |
| 2011/0083968 A1 | 4/2011 | Gilliam et al. |
| 2011/0114501 A1 | 5/2011 | Teamey et al. |
| 2011/0114502 A1 | 5/2011 | Cole et al. |
| 2011/0114503 A1 | 5/2011 | Sivasankar et al. |
| 2011/0114504 A1 | 5/2011 | Sivasankar et al. |
| 2011/0143929 A1 | 6/2011 | Sato et al. |
| 2011/0186441 A1 | 8/2011 | Lafrancois et al. |
| 2011/0226632 A1 | 9/2011 | Cole et al. |
| 2011/0237830 A1 | 9/2011 | Masel |
| 2012/0043301 A1 | 2/2012 | Arvin et al. |
| 2012/0292196 A1 | 11/2012 | Albrecht et al. |
| 2012/0295172 A1 | 11/2012 | Peled et al. |
| 2012/0298522 A1 | 11/2012 | Shipchandler et al. |
| 2012/0329657 A1 | 12/2012 | Eastman et al. |
| 2013/0062216 A1 | 3/2013 | Yotsuhashi et al. |
| 2013/0098772 A1 | 4/2013 | Bocarsly et al. |
| 2013/0105330 A1 | 5/2013 | Teamey et al. |
| 2013/0134048 A1 | 5/2013 | Teamey et al. |
| 2013/0134049 A1 | 5/2013 | Teamey et al. |

(56) References Cited

U.S. PATENT DOCUMENTS

FOREIGN PATENT DOCUMENTS

| | | |
|---|---|---|
| DE | 1047765 A | 12/1958 |
| DE | 2301032 A | 7/1974 |
| EP | 0081982 B1 | 5/1985 |
| EP | 0390157 B1 | 5/2000 |
| FR | 853643 | 3/1940 |
| JP | 64-015388 | 1/1989 |
| JP | 07258877 A | 10/1995 |
| WO | WO 9724320 A1 | 7/1997 |
| WO | WO9850974 A1 | 11/1998 |
| WO | WO 0015586 A1 | 3/2000 |
| WO | WO0025380 A2 | 5/2000 |
| WO | WO02059987 A3 | 8/2002 |
| WO | WO 03004727 A2 | 1/2003 |
| WO | WO 200467673 A1 | 8/2004 |
| WO | WO 2007041872 A1 | 4/2007 |
| WO | WO2007041872 A1 | 4/2007 |
| WO | WO2007058608 A1 | 5/2007 |
| WO | WO2007119260 A2 | 10/2007 |
| WO | WO2008016728 A2 | 2/2008 |
| WO | WO2008017838 A1 | 2/2008 |
| WO | WO2008124538 A1 | 10/2008 |
| WO | WO2009002566 A1 | 12/2008 |
| WO | WO2009145624 A1 | 12/2009 |
| WO | WO2010010252 A2 | 1/2010 |
| WO | WO2010042197 A1 | 4/2010 |
| WO | WO2010088524 A2 | 8/2010 |
| WO | WO2010138792 A1 | 12/2010 |
| WO | WO2011010109 A1 | 1/2011 |
| WO | WO2011068743 A2 | 6/2011 |
| WO | WO2011120021 A1 | 9/2011 |
| WO | WO2011123907 A1 | 10/2011 |
| WO | WO2011133264 A1 | 10/2011 |
| WO | WO 2012046362 A1 | 4/2012 |

OTHER PUBLICATIONS

Hara et al., "Electrochemical Reduction of Carbon Dioxide Under High Pressure on Various Electrodes in an Aqueous Electrolyte", Journal of Electroanalytical Chemistry (no month, 1995), vol. 391, pp. 141-147.

Scibioh et al., "Electrochemical Reduction of Carbon Dioxide: A Status Report", Proc Indian Natn Sci Acad (May 2004), vol. 70, A, No. 3, pp. 407-462.

Yamamoto et al., "Production of Syngas Plus Oxygen From CO2 in a Gas-Diffusion Electrode-Based Electrolytic Cell", Electrochimica Acta (no month, 2002), vol. 47, pp. 3327-3334.

Seshadri et al., "A New Homogeneous Electrocatalyst for the Reduction of Carbon Dioxide to Menthanol at Low Overpotential", Journal of Electroanalytical Chemistry, 372 pp. 145-150, Jul. 8, 1994, figure 1; p. 146-147.

Doherty, "Electrochemical Reduction of Butyraldehyde in the Presence of CO2", Electrochimica Acta 47(2002) 2963-2967.

Udupa et al., "The Electrolytic Reduction of Carbon Dioxide to Formic Acid", Electrochimica Acta (no month, 1971), vol. 16, pp. 1593-1598.

Jitaru, Maria, "Electrochemical Carbon Dioxide Reduction"—Fundamental and Applied Topics (Review), Journal of the University of Chemical Technology and Metallurgy (2007), vol. 42, No. 4, pp. 333-344.

Sloop et al., "The Role of Li-ion Battery Electrolyte Reactivity in Performance Decline and Self-Discharge", Journal of Power Sources (no month, 2003), vols. 119-121, pp. 330-337.

Shibata, Masami, et al., "Electrochemical Synthesis of Urea at Gas-Diffusion Electrodes", J. Electrochem. Soc., vol. 145, No. 2, Feb. 1998, pp. 595-600, The Electrochemical Society, Inc.

Shibata, Masami, et al., "Simultaneous Reduction of Carbon Dioxide and Nitrate Ions at Gas-Diffusion Electrodes with Various Metal-lophthalocyanine Catalysts", From a paper presented at the 4th International Conference on Electrocatalysis: From Theory to Industrial Applications, Sep. 22-25, 2002, Como, Italy, Electrochimica Acta 48 (2003) 3959-3958.

Harrison et al., "The Electrochemical Reduction of Organic Acids", Electroanalytical Chemistry and Interfacial Electrochemistry (no month, 1971), vol. 32, No. 1, pp. 125-135.

Chauhan et al., "Electro Reduction of Acetophenone in Pyridine on a D.M.E.", J Inst. Chemists (India) [Jul. 1983], vol. 55, No. 4, pp. 147-148.

Czerwinski et al, "Adsorption Study of CO2 on Reticulated Vitreous Carbon (RVC) covered with Platinum," Analytical Letters, vol. 18, Issue 14 (1985), pp. 1717-1722.

Jitaru, Lowy, Toma, Toma and Oniciu, "Electrochemical Reduction of Carbon Dioxide on Flat Metallic Cathodes," Journal of Aplied Electrochemistry, 1997, vol. 27, p. 876.

Popic, Avramov, and Vukovic, "Reduction of Carbon Dioxide on Ruthenium Oxide and Modified Ruthenium Oxide Electrodes in 0.5M NaHCO3," Journal of Electroanalytical Chemistry, 1997, vol. 421, pp. 105-110.

Eggins and McNeill, "Voltammetry of Carbon Dioxide. I. A General Survey of Voltammetry at Different Electrode Materials in Different Solvents," Journal of Electroanalytical Chemistry, 1983, vol. 148, pp. 17-24.

Kostecki and Augustynski, "Electrochemical Reduction of CO2 at an Active Silver Electrode," Ber. Busenges. Phys. Chem., 1994, vol. 98, pp. 1510-1515.

Non-Final Office Action for U.S. Appl. No. 12/846,221, dated Nov. 21, 2012.

Non-Final Office Action for U.S. Appl. No. 12/846,002, dated Sep. 11, 2012.

Non-Final Office Action for U.S. Appl. No. 12/845,995, dated Aug. 13, 2012.

Non-Final Office Action for U.S. Appl. No. 12/696,840, dated Jul. 9, 2012.

DNV (Det Norske Veritas), Carbon Dioxide Utilization, Electrochemical Conversion of CO2—Opportunities and Challenges, Research and Innovation, Position Paper, Jul. 2011.

Matthew R. Hudson, Electrochemical Reduction of Carbon Dioxide, Department of Chemistry, State University of New York at Potsdam, Potsdam New York 13676, pp. 1-15, Dec. 9, 2005.

Colin Oloman and Hui Li, Electrochemical Processing of Carbon Dioxide, ChemSusChem 2008, 1, 385-391, (c) 2008 Wiley-VCH Verlag GmbH& Co. KGaA, Weinheim, www.chemsuschem.org.

R.P.S. Chaplin and A.A. Wragg; Effects of Process Conditions and Electrode Material on Reaction Pathways for Carbon Dioxide Electroreduction with Particular Reference to Formate Formation; Journal of Applied Electrochemistry 33: pp. 1107-1123; © 2003 Kluwer Academics Publishers. Printed in the Netherlands.

Akahori, Iwanaga, Kato, Hamamoto, Ishii; New Electrochemical Process for CO2 Reduction to from Formic Acid from Combustion Flue Gases; Electrochemistry; vol. 4; pp. 266-270.

Ali, Sato, Mizukawa, Tsuge, Haga, Tanaka; Selective formation of HCO2- and C2O42-in electrochemical reduction of CO2 catalyzed by mono- and di-nuclear ruthenium complexes; Chemistry Communication; 1998; Received in Cabridge, UK, Oct. 13, 1997; 7/07363A; pp. 249-250.

Wang, Maeda, Thomas, Takanabe, Xin, Carlsson, Domen, Antonietti; A metal-free polymeric photocatalyst for hydrogen productino from water under visible light; Nature Materials; Published Online Nov. 9, 2008; www.nature.com/naturematerials; pp. 1-5.

Aresta and DiBenedetto; Utilisation of CO2 as a Chemical Feedstock: Opportunities and Challenges; Dalton Transactions; 2007; pp. 2975-2992; © The Royal Society of Chemistry 2007.

B. Aurian-Blajeni, I. Taniguchi, and J. O'M.Bockris; Photoelectrochemical Reduction of Carbon Dioxide Using Polyaniline-Coated Silicon; J. Electroanal. Chem.; vol. 149; 1983; pp. 291-293; Elsevier Sequoia S.A., Lausanne, Printed in The Netherlands.

Azuma, Hashimoto, Hiramoto, Watanabe, Sakata; Electrochemical Reduction of Carbon Dioxide on Various Metal Electrodes in Low-Temperate Aqueous KHCO3 Media; J. Electrochem. Soc., vol. 137, No. 5, Jun. 1990 © The Electrochemical Society, Inc.

(56) References Cited

OTHER PUBLICATIONS

Bandi and Kuhne; Electrochemical Reduction of Carbon Dioxide in Water: Analysis of Reaction Mechanism on Rutherium-Titanium-Oxide; J. Electrochem. Soc., vol. 139, No. 6, Jun. 1992 © The Electrochemical Society, Inc.

Beley, Collin, Sauvage, Petit, Chartier; Photoassisted Electro-Reduction of $CO_2$ On p-GaAs in the Presence of Ni Cyclam; J. Electroanal. Chem. vol. 206, 1986, pp. 333-339, Elsevier Sequoia S.A., Lausanne, Printed in The Netherlands.

Benson, Kubiak, Sathrum, and Smieja; Electrocatalytic and homogeneous approaches to conversion of $CO_2$ to liquid fuels; Chem. Soc. Rev., 2009, vol. 38, pp. 89-99, © The Royal Society of Chemistry 2009.

Taniguchi, Adrian-Blajeni, and Bockris; The Mediation of the Photoelectrochemical Reduction of Carbon Dioxide by Ammonium Ions; J. Electroanal. Chem., vol. 161, 1984, pp. 385-388, Elsevier Sequoia S.A., Lausanne—Printed in The Netherlands.

Bockris and Wass; The Photoelectrocatalytic Reduction of Carbon Dioxide; J. Electrochem. Soc., vol. 136, No. 9, Sep. 1989, pp. 2521-2528, © The Electrochemical Society, Inc.

Carlos R. Cabrera and Hector D. Abruna; Electrocatalysis of $CO_2$ Reduction at Surface Modified Metallic and Semiconducting Electrodes; J. Electroanal. Chem. vol. 209, 1986, pp. 101-107, Elsevier Sequoia S.A., Lausanne—Printed in The Netherlands, © 1986 Elsevier Sequoia S.A.

D. Canfield and K.W. Frese, Jr.; Reduction of Carbon Dioxide to Methanol on n- and p-GaAs and p-InP. Effect of Crystal Face, Electrolyte and Current Density; Journal of the Electrochemical Society; Aug. 1983, pp. 1772-1773.

Huang, Lu, Zhao, Li, and Wang; The Catalytic Role of N-Heterocyclic Carbene in a Metal-Free Conversion of Carbon Dioxide into Methanol: A computational Mechanism Study; J. Am. Chem. Soc. 2010, vol. 132, pp. 12388-12396, © American Chemical Society.

Arakawa, et al. Catalysis Research of Relevance to Carbon Management: Process, Challenges, and Opportunities; Chem. Rev. 2001, vol. 201, pp. 953-996.

Cheng, Blaine, Hill, and Mann; Electrochemical and IR Spectroelectrochemical Studies of the Electrocatalytic Reduction of Carbon Dioxide by [Ir2(diment)4]2+ (dimen = 1,8-Diisocyanomenthane), Inorg. Chem. 1996, vol. 35, pp. 7704-7708, © 1996 American Chemical Society.

Stephen K Ritter; What Can We Do With Carbon Dioxide?, Chemical & Engineering News, Apr. 30, 2007, vol. 85, No. 18,pp. 11-17, http://pubs.acs.org/cen/coverstory/85/8518cover.html.

J. Beck, R. Johnson, and T. Naya; Electrochemical Conversion of Carbon Dioxide to Hydrocarbon Fuels, EME 580 Spring 2010, pp. 1-42.

Aydin and Koleli, Electrochemical reduction of $CO_2$ on a polyaniline electrode under ambient conditions and at high pressure in methanol, Journal of Electroanalytical Chemistry vol. 535 (2002) pp. 107-112, www.elsevier.com/locate/jelechem.

Etsuko Fujita, Photochemical $CO_2$ Reduction: Current Status and Future Prospects, American Chemical Society's New York Section, Jan. 15, 2011, pp. 1-29.

Toshio Tanaka, Molecular Orbital Studies on the Two-Electron Reduction of Carbon Dioxide to Give Formate Anion, Memiors of Fukui University of Technology, vol. 23, Part 1, 1993, pp. 223-230.

A. Bewick and G.P. Greener, The Electroreduction of $CO_2$ to Glycollate on a Lead Cathode, Tetrahedron Letters No. 5, pp. 391-394, 1970, Pergamon Press, Printed in Great Britain.

Centi, Perathoner, Wine, and Gangeri, Electrocatalytic conversion of $CO_2$ to long carbon-chain hydrocarbons, Green Chem., 2007, vol. 9, pp. 671-678, © The Royal Society of Chemistry 2007.

A. Bewick and G.P. Greener, The Electroreduction of $CO_2$ to Malate on a Mercury Cathode, Tetrahedron Letters No. 53, pp. 4623-4626, 1969, Pergamon Press, Printed in Great Britain.

Eggins, Brown, Mcneill, and Grimshaw, Carbon Dioxide Fixation by Electrochemical Reduction in Water to Oxalate and Glyoxylate, Tetrahedron Letters vol. 29, No. 8, pp. 945-948, 1988, Pergamon Journals Ltd., Printed in Great Britain.

Cook, MacDuff, and Sammells; High Rate Gas Phase $CO_2$ Reduction to Ethylene and Methane Using Gas Diffusion Electrodes, J. Electrochem. Soc., vol. 137, No. 2, pp. 607-608, Feb. 1990, © The Electrochemical Society, Inc.

Daube, Harrison, Mallouk, Ricco, Chao, Wrighton, Hendrickson, and Drube; Electrode-Confined Catalyst Systems for Use in Optical-to-Chemical Energy Conversion; Journal of Photochemistry, vol. 29, 1985, pp. 71-88.

Dewulf, Jin, and Bard; Electrochemical and Surface Studies of Carbon Dioxide Reduction to Methane and Ethylene at Copper Electrodes in Aqueous Solutions; J. Electrochem. Soc., vol. 136, No. 6, Jun. 1989, pp. 1686-1691, © The Electrochemical Society, Inc.

J. Augustynski, P. Kedzierzawski, and B. Jermann, Electrochemical Reduction of $CO_2$ at Metallic Electrodes, Studies in Surface Science and Catalysis, vol. 114, pp. 107-116, © 1998 Elsevier Science B.V.

Sung-Woo Lee, Jea-Keun Lee, Kyoung-Hag Lee, and Jun-Heok Lim, Electrochemical reduction of Co and H2 from carbon dioxide in aqua-solution, Current Applied Physics, vol. 10, 2010, pp. S51-S54.

Andrew P. Abbott and Christopher A. Eardley, Electrochemical Reduction of $CO_2$ in a Mixed Supercritical Fluid, J. Phys. Chem. B, 2000, vol. 104, pp. 775-779.

S. Kapusta and N. Hackerman, The Electroreduction of Carbon Dioxide and Formic Acid on Tin and Indium Electrodes, J. Electrochem. Soc.: Electrochemical Science and Technology, Mar. 1983, pp. 607-613.

M Aulice Scibioh and B Viswanathan, Electrochemical Reduction of Carbon Dioxide: A Status Report, Proc Indian Natn Sci Acad, vol. 70, A, No. 3, May 2004, pp. 1-56.

N. L. Weinberg, D. J. Mazur, Electrochemical hydrodimerization of formaldehyde to ethylene glycol, Journal of Applied Electrochemistry, vol. 21, 1991, pp. 895-901.

R.P.S. Chaplin and A.A. Wragg, Effects of process conditions and electrode material on reaction pathways for carbon dioxide electroreduction with particular reference to formate formation, Journal of Applied Electrochemistry vol. 33, pp. 1107-1123, 2003, © 2003 Kluwer Academic Publishers. Printed in the Netherlands.

M.N. Mahmood, D. Masheder, and C.J. Harty, Use of gas-diffusion electrodes for high-rate electrochemical reduction of carbon dioxide. I. Reduction at lead, indium- and tin-impregnated electrodes, Journal of Applied Electrochemistry, vol. 17, 1987, pp. 1159-1170.

Summers, Leach, and Frese, The Electrochemical Reduction of Aqueous Carbon Dioxide to Methanol at Molybdenum Electrodes with Low Overpotentials, J. Electroanal. Chem., vol. 205, 1986, pp. 219-232, Elseiver Sequoia S.A., Lausanne—Printed in the Netherlands.

Frese and Leach, Electrochemical Reduction of Carbon Dioxide to Methane, Methanol, and Co on Ru Electrodes, Journal of the Electrochemical Society, Jan. 1985, pp. 259-260.

Frese and Canfield, Reduction of $CO_2$ on n-GaAs Electrodes and Selective Methanol Synthesis, J. Electrochem. Soc.: Electrochemical Science and Technology, vol. 131, No. 11, Nov. 1984, pp. 2518-2522.

M. Gattrell, N. Gupta, and A. Co, A Review of the aqueous electrochemical reduction of $CO_2$ to hydrocarbons at copper, Journal of Electroanalytical Chemistry, vol. 594, 2006, pp. 1-19.

Mahmood, Masheder, and Harty; Use of Gas-Diffusion Electrodes for High-Rate Electrochemical Reduction of Carbon Dioxide. II. Reduction at Metal Phthalocyanine-impregnated Electrodes; Journal of Applied Electrochemistry, vol. 17, 1987, pp. 1223-1227.

Gennaro, Isse, Saveant, Severin, and Vianello; Homogeneous Electron Transfer Catalysis of the Electrochemical Reduction of Carbon Dioxide. Do Aromatic Anion Radicals React in an Outer-Sphere Manner?; J. Am. Chem. Soc., 1996, vol. 118, pp. 7190-7196.

J. Giner, Electrochemical Reduction of $CO_2$ on Platinum Electrodes in Acid Solutions, Electrochimica Acta, 1963, vol. 8, pp. 857-865, Pregamon Press Ltd., Printed in Northern Ireland.

John Leonard Haan, Electrochemistry of Formic Acid and Carbon Dioxide on Metal Electrodes with Applications to Fuel Cells and Carbon Dioxide Conversion Devices, 2010, pp. 1-205.

M. Halmann, Photoelectrochemical reduction of aqueous carbon dioxide on p-type gallium phosphide in liquid junction solar cells, Nature, vol. 275, Sep. 14, 1978, pp. 115-116.

H. Ezaki, M. Morinaga, and S. Watanabe, Hydrogen Overpotential for Transition Metals and Alloys, and its Interpretation Using an

(56) References Cited

OTHER PUBLICATIONS

Electronic Model, Electrochimica Acta, vol. 38, No. 4, 1993, pp. 557-564, Pergamon Press Ltd., Printed in Great Britain.

K.S. Udupa, G.S. Subramanian, and H.V.K. Udupa, The Electrolytic Reduction of Carbon Dioxide to Formic Acid, Electrochimica Acta, 1971, vol. 16, pp. 1593-1598, Pergamon Press., Printed in Northern Ireland.

Ougitani, Aizawa, Sonoyama, and Sakata; Temperature Dependence of the Probability of Chain Growth for Hydrocarbon Formation by Electrochemical Reduction of CO2, Bull. Chem. Soc. Jpn., vol. 74, pp. 2119-2122, 2001.

Furuya, Yamazaki, and Shibata; High performance Ru-Pd catalysts for CO2 reduction at gas-diffusion electrodes, Journal of Electroanalytical Chemistry, vol. 431, 1997, pp. 39-41.

R. Hinogami, Y. Nakamura, S. Yae, and Y. Nakato; An Approach to Ideal Semiconductor Electrodes for Efficient Photoelectrochemical Reduction of Carbon Dioxide by Modification with Small Metal Particles, J. Phys. Chem. B, 1998, vol. 102, pp. 974-980.

Reda, Plugge, Abram, and Hirst; Reversible interconversion of carbon dioxide and formate by an electroactive enzyme, PNAS, Aug. 5, 2008, vol. 105, No. 31, pp. 10654-10658, www.pnas.org/cgi/doi/10.1073pnas.0801290105.

Y. Hori, Electrochemical CO2 Reduction on Metal Electrodes, Modern Aspects of Electrochemistry, No. 42, edited by C. Vayenas et al., Springer, New York, 2008, pp. 89-189.

Hori, Yoshio; Suzuki, Shin, Cathodic Reduction of Carbon Dioxide for Energy Storage, Journal of the Research Institute for Catalysis Hokkaido University, 30(2): 81-88, Feb. 1983, http://hdl.handle.net/2115/25131.

Hori, Wakebe, Tsukamoto, and Koga; Electrocatalytic Process of CO Selectivity in Electrochemical Reduction of CO2 at Metal Electrodes in Aqueous Media, Electrochimica Acta, vol. 39, No. 11/12, pp. 1833-1839, 1994, Copyright 1994 Elsevier Science Ltd.,Pergamon, Printed in Great Britain.

Hori, Kikuchi, and Suzuki; Production of Co and CH4 in Electrochemical Reduction of CO2 at Metal Electrodes in Aqueous Hydrogencarbonate Solution; Chemistry Letters, 1985, pp. 1695-1698, Copyright 1985 The Chemical Society of Japan.

Hori, Kikuchi, Murata, and Suzuki; Production of Methane and Ethylene in Electrochemical Reduction of Carbon Dioxide at Copper Electrode in Aqueous Hydrogencarbonate Solution; Chemistry Letters, 1986, pp. 897-898, Copyright 1986 The Chemical Society of Japan.

Hoshi, Suzuki, and Hori; Step Density Dependence of CO2 Reduction Rate on Pt(S)-[n(111)×(111)] Single Crystal Electrodes, Electrochimica Acta, vol. 41, No. 10., pp. 1617-1653, 1996, Copyright 1996 Elsevier Science Ltd. Printed in Great Britain.

Hoshi, Suzuki, and Hori; Catalytic Activity of CO2 Reduction on Pt Crystal-Single Electrodes: Pt(S)-[n(111)×(111)], Pt(S)-[n(111)×(100)], and Pt(S)-[n(100)×(111)], J. Phys. Chem. B, 1997, vol. 101, pp. 8520-8524.

Ikeda, Saito, Yoshida, Noda, Maeda, and Ito; Photoelectrochemical reduction products of carbon dioxide at metal coated p-GaP photocathodes in non-aqueous electrodes, J. Electroanal. Chem., 260 (1989) pp. 335-345, Elsevier Sequoia S.A., Lauasanne—Printed in The Netherlands.

Noda, Ikeda, Oda, Imai, Maeda, and Ito; Electrochemical Reduction of Carbon Dioxide at Various Metal Electrodes in Aqueous Potassium Hydrogen Carbonate Solution, Bull. Chem. Soc. Jpn., 63, pp. 2456-2462, 1990, Copyright 1990 The Chemical Society of Japan.

S.R. Narayanan, B. Haines, J. Soler, and T.I. Valdez; Electrochemical Conversion of Carbon Dioxide to Formate in Alkaline Polymer Electrolyte Membrane Cells, Journal of The Electrochemical Society, 158 (2) A167-A173 (2011).

Tooru Inoue, Photoelectrocatalytic reduction of carbon dioxide in aqueous suspensions of semiconductor powders, Nature, vol. 277, Feb. 22, 1979, pp. 637-638.

B. Jermann and J. Augustynski, Long-Term Activation of the Copper Cathode in the Course of CO2 Reduction, Electrochimica Acta, vol. 39, No. 11/12, pp. 1891-1896, 1994, Elsevier Science Ltd., Printed in Great Britain.

Jitaru, Lowy, M. Toma, B.C. Toma, and L. Oniciu; Electrochemical reduction of carbon dioxide on flat metallic cathodes; Journal of Applied Electrochemistry 27 (1997) 875-889, Reviews in Applied Electrochemistry No. 45.

Maria Jitaru, Electrochemical Carbon Dioxide Reduction-Fundamental and Applied Topics (Review), Journal of the University of Chemical Technology and Metallurgy, 42, 4, 2007, 333-344.

Kaneco, Katsumata, Suzuki, and Ohta; Photoelectrocatalytic reduction of CO2 in LiOH/methanol at metal-modified p-InP electrodes, Applied Catalysis B: Environmental 64 (2006) 139-145.

J.J. Kim, D.P. Summers, and K.W. Frese, Jr; Reduction of CO2 and CO to Methane on Cu Foil Electrodes, J. Electroanal. Chem., 245 (1988) 223-244, Elsevier Sequoia S.A., Lausanne—Printed in the Netherlands.

Osamu Koga and Yoshio Hori, Reduction of Adsorbed CO a Ni Electrode in Connection with the Electrochemical Reduction of CO2, Electrochimica Acta, vol. 38, No. 10, pp. 1391-1394, 1993, Printed in Great Britain.

Breedlove, Ferrence, Washington, and Kubiak; A photoelectrochemical approach to splitting carbon dioxide for a manned mission to Mars, Materials and Design 22 (2001) 577-584, © 2001 Elsevier Science Ltd.

Simon-Manso and Kubiak, Dinuclear Nickel Complexes as Catalysts for Electrochemical Reduction of Carbon Dioxide, Organometallics 2005, 24, pp. 96-102, © 2005 American Chemical Society.

Kushi, Nagao, Nishioka, Isobe, and Tanaka; Remarkable Decrease in Overpotential of Oxalate Formation in Electrochemical C02 Reduction by a Metal-Sulfide Cluster, J. Chem. Soc., Chem. Commun., 1995, pp. 1223-1224.

Kuwabata, Nishida, Tsuda, Inoue, and Yoneyama; Photochemical Reduction of Carbon Dioxide to Methanol Using ZnS Microcrystallite as a Photocatalyst in the Presence of Methanol Dehydrogenase, J. Electrochem. Soc., vol. 141, No. 5, pp. 1498-1503, Jun. 1994, © The Electrochemical Society, Inc.

Jean-Marie Lehn and Raymond Ziessel, Photochemical generation of carbon monoxide and hydrogen by reduction of carbon dioxide and water under visible light irradiation, Proc. Natl. Acad. Sci. USA, vol. 79, pp. 701-704, Jan. 1982, Chemistry.

Li and Prentice, Electrochemical Synthesis of Methanol from CO2 in High-Pressure Electrolyte, J. Electrochem. Soc., vol. 144, No. 12, Dec. 1997 © The Electrochemical Society, Inc., pp. 4284-4288.

Azuma, Hashimoto, Hiramoto, Watanabe, and Sakata; Carbon dioxide reduction at low temperature on various metal electrodes, J. Electroanal. Chem., 260 (1989) 441-445, Elsevier Sequoia S.A., Lausanne—Printed in The Netherlands.

Goettmann, Thomas, and Antonietti; Metal-Free Activation of CO2 by Mesoporous Graphitic Carbon Nitride; Angewandte Chemie; Angew. Chem. Int. Ed. 2007, 46, 2717-2720.

Yu B Vassiliev, V S Bagotzky, O.A. Khazova and NA Mayorova; Electroreduction of Carbon Dioxide Part II. The Mechanism of Reduction in Aprotic Solvents, J Electroanal. Chem, 189 (1985) 295-309 Elsevier Sequoia S.A., Lausanne—Printed in The Netherlands.

Whipple, Finke, and Kenis; Microfluidic Reactor for the Electrochemical Reduction of Carbon Dioxide: The Effect of pH; Electrochemical and Solid-State Letters, 13 (9) B109-B111 (2010), 1099-0062/2010/19(9)/B109/3/$28.00 © The Electrochemical Society.

Zhai, Chiachiarelli, and Sridhar; Effects of Gaseous Impurities on the Electrochemical Reduction of CO2 on Copper Electrodes; ECS Transactions, 19 (14) 1-13 (2009), 10.1149/1.3220175 © The Electrochemical Society.

R.D.L. Smith, P.G. Pickup, Nitrogen-rich polymers for the electrocatalytic reduction of CO2, Electrochem. Commun. (2010), doi:10.1016/j.elecom.2010.10.013.

B.Z. Nikolic, H. Huang, D. Gervasio, A. Lin, C. Fierro, R.R. Adzic, and E.B. Yeager; Electroreduction of carbon dioxide on platinum single crystal electrodes: electrochemical and in situ FTIR studies; J. Electmanal. Chem., 295 (1990) 415-423; Elsevier Sequoia S.A., Lausanne.

(56) References Cited

OTHER PUBLICATIONS

Nogami, Itagaki, and Shiratsuchi; Pulsed Electroreduction of CO2 on Copper Electrodes-II; J. Electrochem. Soc., vol. 141, No. 5, May 1994 © The Electrochemical Society, Inc., pp. 1138-1142.

Ichiro Oda, Hirohito Ogasawara, and Masatoki Ito; Carbon Monoxide Adsorption on Copper and Silver Electrodes during Carbon Dioxide Electroreduction Studied by Infrared Reflection Absorption Spectroscopy and Surface-Enhanced Raman Spectroscopy; Langmuir 1996, 12, 1094-1097.

Kotaro Ogura Kenichi Mine, Jun Yano, and Hideaki Sugihara; Electrocatalytic Generation of C2 and C3 Compounds from Carbon Dioxide on a Cobalt Complex-immobilized Dual-film Electrode; J. Chem. Soc., Chem. Commun., 1993, pp. 20-21.

Ohkawa, Noguchi, Nakayama, Hashimoto, and Fujishima; Electrochemical reduction of carbon dioxide on hydrogen-storing materials Part 3. The effect of the absorption of hydrogen on the palladium electrodes modified with copper; Journal of Electroanlytical Chemistry, 367 (1994) 165-173.

Sanchez-Sanchez, Montiel, Tryk, Aldaz, and Fujishima; Electrochemical approaches to alleviation of the problem of carbon dioxide accumulation; Pure Appl. Chem., vol. 73, No. 12, pp. 1917-1927, 2001, © 2001 IUPAC.

D. J. Pickett and K. S. Yap, A study of the production of glyoxylic acid by the electrochemical reduction of oxalic acid solutions, Journal of Applied Electrochemistry 4 (1974) 17-23, Printed in Great Britain, © 1974 Chapman and Hall Ltd.

Bruce A. Parkinson & Paul F. Weaver, Photoelectrochemical pumping of enzymatic CO2 reduction, Nature, vol. 309, May 10, 1984, pp. 148-149.

Paul, Tyagi, Bilakhiya, Bhadbhade, Suresh, and Ramachandraiah; Synthesis and Characterization of Rhodium Complexes Containing 2,4,6-Tris(2-pyridyl)-1,3,5-triazine and Its Metal-Promoted Hydrolytic Products: Potential Uses of the New Complexes in Electrocatalytic Reduction of Carbon Dioxide; Inorg. Chem. 1998, 37, 5733-5742.

Furuya, Yamazaki, and Shibata; High performance Ru-Pd catalysts for CO2 reduction at gas-diffusion electrodes, Journal of Electroanalytical Chemistry 431 (1997) 39-41.

Petit, Chartier, Beley, and Deville; Molecular catalysts in photoelectrochemical cells Study of an efficient stystem for the selective photoelectroreduction of CO2: p-GaP or p-GaAs / Ni( cyclam) 2+, aqueous medium; J. Electroanal. Chem., 269 (1989) 267-281; Elsevier Sequoia S.A., Lausanne—Printed in The Netherlands.

Popic, Avramov-Ivic, and Vukovic; Reduction of carbon dioxide on ruthenium oxide and modified ruthenium oxide electrodes in 0.5 M NaHCO3, Journal of Electroanalytical Chemistry 421 (1997) 105-1100

Whipple and Kenis, Prospects of CO2 Utilization via Direct Heterogeneous Electrochemical Reduction, J. Phys. Chem. Lett. 2010, 1, 3451-3458, © 2010 American Chemical Society.

P.A. Christensen & S.J. Higgins, Preliminary note the electrochemical reduction of CO2 to oxalate at a Pt electrode immersed in acetonitrile and coated with polyvinylalcohol/[Ni(dppm)2CI2], Journal of Electroanalytical Chemistry, 387 (1995) 127-132.

Qu, Zhang, Wang, and Xie; Electrochemical reduction of CO2 on RuO2/TiO2 nanotubes composite modified Pt electrode, Electrochimica Acta 50 (2005) 3576-3580.

Jin, Gao, Jin, Zhang, Cao, ; Wei, and Smith; High-yield reduction of carbon dioxide into formic acid by zero-valent metal/metal oxide redox cycles; Energy Environ. Sci., 2011, 4, pp. 881-884.

Yu B Vassiliev, V S Bagotzky. N V Osetrova and A A Mikhailova; Electroreduction of Carbon Dioxide Part III. Adsorption and Reduction of CO2 on Platinum Metals; J Electroanal Chem. 189 (1985) 311-324, Elsevier Sequoia SA, Lausanne—Printed in The Netherlands.

M. Gattrell, N. Gupta, and A. Co; A review of the aqueous electrochemical reduction of CO2 to hydrocarbons at copper; Journal of Electroanalytical Chemistry 594 (2006) 1-19.

Hoshi, Ito, Suzuki, and Hori; Preliminary note CO 2 Reduction on Rh single crystal electrodes and the structural effect; Journal of Electroanalytical Chemistry 395 (1995) 309 -312.

Rudolph, Dautz, and Jager; Macrocyclic [N42-] Coordinated Nickel Complexes as Catalysts for the Formation of Oxalate by Electrochemical Reduction of Carbon Dioxide; J. Am. Chem. Soc. 2000, 122, 10821-10830, Published on Web Oct. 21, 2000.

Ryu, Andersen, and Eyring; The Electrode Reduction Kinetics of Carbon Dioxide in Aqueous Solution; The Journal of Physical Chemistry, vol. 76, No. 22, 1972, pp. 3278-3286.

Zhao, Jiang, Han, Li, Zhang, Liu, Hi, and Wu; Electrochemical reduction of supercritical carbon dioxide in ionic liquid 1-n-butyl-3-methylimidazolium hexafluorophosphate; J. of Supercritical Fluids 32 (2004) 287-291.

Schwartz, Cook, Kehoe, Macduff, Patel, and Sammells; Carbon Dioxide Reduction to Alcohols using Perovskite-Type Electrocatalysts; J. Electrochem. Soc., vol. 140, No. 3, Mar. 1993 © The Electrochemical Society, Inc., pp. 614-618.

Ikeda, Takagi, and Ito; Selective Formation of Formic Acid, Oxalic Acid, and Carbon Monoxide by Electrochemical Reduction of Carbon Dioxide; Bull. Chem. Soc. Jpn., 60, 2517-2522 (1987) © 1987 The Chemical Society of Japan.

Seshadri, Lin, and Bocarsly; A new homogeneous electrocatalyst for the reduction of carbon dioxide to methanol at low overpotential; Journal of Electroanalytical Chemistry, 372 (1994) 145-150.

Shiratsuchi, Aikoh, and Nogami; Pulsed Electroreduction of CO2 on Copper Electrodes; J, Electrochem. Soc., vol. 140, No. 12, Dec. 1993 © The Electrochemical Society, Inc.

Centi & Perathoner; Towards Solar Fuels from Water and CO2; ChemSusChem 2010, 3, 195-208, © 2010 Wiley-VCH Verlag GmbH& Co. KGaA, Weinheim.

David P. Summers, Steven Leach and Karl W. Frese Jr.; The Electrochemical Reduction of Aqueous Carbon Dioxide to Methanol at Molybdenum Electrodes With Low Overpotentials; J Electroanal. Chem., 205 (1986) 219-232, Elsevier Sequoia S.A., Lausanne—Printed in The Netherlands.

Isao Taniguchi, Benedict Aurian-Blajeni and John O'M. Brockris; Photo-Aided Reduction of Carbon Dioxide to Carbon Monoxide; J. Electroanal. Chem, 157 (1983) 179-182, Elsevier Sequoia S.A., Lausanne—Printed in The Netherlands.

Isao Tahniuchi, Benedict Aurian-Blajeni and John O'M. Brockris; The Mediation of the Photoelectrochemical Reduction of Carbon Dioxide by Ammonium Ions; J. Electroanal. Chem, 161 (1984) 385-388, Elsevier Sequoia S.A., Lausanne—Printed in The Netherlands.

Hiroshi Yoneyama, Kenji Sugimura and Susumu Kuwabata; Effects of Electrolytes on the Photoelectrochemical Reduction of Carbon Dioxide at Illumiated p-Type Cadmium Telluride and p-Type Indium Phosphide Electrodes in Aqueous Solutions; J. Electroanal. Chem., 249 (1988) 143-153, Elsevier SEquoia, S.A., Lausanne—Printed in The Netherlands.

Whipple, Finke, and Kenis; Microfluidic Reactor for the Electrochemical Reduction of Carbon Dioxide: The Effect of pH; Electrochemical and Solid-State Letters, 13 (9) B109-B111 (2010).

YLB Vassiliev, V S Bagotzky, N V. Osetrov, O.A. Khazova and NA Mayorova; Electroreduction of Carbon Doxide Part I. The Mechanism and Kinetics of Electroreduction of CO2 in Aqueous Solutions on Metals with High and Moderate Hydrogen Overvoltages; J Electroanal. Chem. 189 (1985) 271-294, Elsevier Sequoia SA, Lausanne—Printed in The Netherlands.

YLB Vassiliev, V S Bagotzky, N V. Osetrov, O.A. Khazova and NA Mayorova; Electroreduction of Carbon Dioxide Part II. The Mechanism of Reduction in Aprotic Solvents; J Electroanal. Chem. 189 (1985) 295-309, Elsevier Sequoia SA, Lausanne—Printed in The Netherlands.

Watanabe, Shibata, Kato, Azuma, and Sakata; Design of Alloy Electrocatalysts for CO2 Reduction III. The Selective and Reversible Reduction of C02 on Cu Alloy Electrodes; J. Electrochem. Soc., vol. 138, No. 11, Nov. 1991 © The Electrochemical Society, Inc., pp. 3382-3389.

Soichiro Yamamura, Hiroyuki Kojima, Jun Iyoda and Wasaburo Kawai; Photocatalytic Reduction of Carbon Dioxide with Metal-Loaded SiC Powders; J. Eleciroanal. Chem., 247 (1988) 333-337, Elsevier Sequoia S.A., Lausanne—Printed in The Netherlands.

(56) References Cited

OTHER PUBLICATIONS

R. Piercy, N. A. Hampson; The electrochemistry of indium, Journal of Applied Electrochemistry 5 (1975) 1-15, Printed in Great Britain, © 1975 Chapman and Hall Ltd.
C. K. Watanabe, K. Nobe; Electrochemical behaviour of indium in H2S204, Journal of Applied Electrochemistry 6 (1976) 159-162, Printed in Great Britain, © 1976 Chapman and Hall Ltd.
Yumi Akahori, Nahoko Iwanaga, Yumi Kato, Osamu Hamamoto, and Mikita Ishii; New Electrochemical Process for CO2 Reduction to from Formic Acid from Combustion Flue Gases; Electrochemistry; vol. 72, No. 4 (2004), pp. 266-270.
Hamamoto, Akahori, Goto, Kato, and Ishii; Modified Carbon Fiber Electrodes for Carbon Dioxide Reduction; Electrochemistry, vol. 72, No. 5 (2004), pp. 322-327.
S. Omanovicâ, M. Metikosï-Hukovic; Indium as a cathodic material: catalytic reduction of formaldehyde; Journal of Applied Electrochemistry 27 (1997) 35-41.
Hara, Kudo, and Sakata; Electrochemical reduction of carbon dioxide under high pressure on various electrodes in an aqueous electrolyte; Journal of Electroanalytical Chemistry 391 (1995) 141-147.
Hori, Kikuchi, and Suzuki; Production of CO and CH4 in Electrochemical Reduction of CO2 at Metal Electrodes in Aqueous Hydrogencarbonate Solution; Chemistry Letters, pp. 1695-1698, 1985. (C) 1985 The Chemical Society of Japan.
Jitaru, Lowy, M. Toma, B.C. Toma, Oniciu; Electrochemical reduction of carbon dioxide on flat metallic cathodes; Journal of Applied Electrochemistry 27 (1997) pp. 875-889, Reviews in Applied Electrochemistry No. 45.
Kaneco, Iwao, Ilba, Itoh, Ohta, and Mizuno; Electrochemical Reduction of Carbon Dioxide on an Indium Wire in a KOH/Methanol-Based Electrolyte at Ambient Temperature and Pressure; Environmental Engineering Science; vol. 16, No. 2, 1999, pp. 131-138.
Todoroki, Hara, Kudo, and Sakata; Electrochemical reduction of high pressure CO2 at Pb, Hg and in electrodes in an aqueous KHCO3 solution; Journal of Electroanalytical Chemistry 394 (1995) 199-203.
R.P.S. Chaplin and A.A. Wragg, Effects of process conditions and electrode material on reaction pathways for carbon dioxide electroreduction with particular reference to formate formation, Journal of Applied Electrochemistry 33: 1107-1123, 2003, Copyright 2003 Kluwer Academic Publishers. Printed in the Netherlands.
Kapusta and Hackerman; The Electroreduction of Carbon Dioxide and Formic Acid on Tin and Indium Electrodes, J. Electrochem. Doc.: Electrochemical Science and Technology, vol. 130, No. 3 Mar. 1983, pp. 607-613.
M. N. Mahmood, D. Masheder, and C. J. Harty; Use of gas-diffusion electrodes for high-rate electrochemical reduction of carbon dioxide. I. Reduction at lead, indium- and tin-impregnanted electrodes; Journal of Applied Electrochemistry 17 (1987) 1156-1170.
Noda, Ikeda, Oda, Imai, Maeda, and Ito; Electrochemical Reduction of Carbon Dioxide at Various Metal Electrodes in Aqueous Potassium Hydrogen Carbonate Solution; Bull. Chem. Soc. Jpn., 63, 2459-2462, 1990, Copyright 1990 Them Chemical Society.
Azuma, Hashimoto, Hiramoto, Watanbe, and Sakata; Carbon dioxide reduction at low temperature on various metal electrodes; J. Electroanal. Chem., 260 (1989) 441-445, Elsevier Sequoia S.A., Lausanne—Printed in The Netherlands.
Vassiliev, Bagotzky, Khazova, and Mayorova; Electroreduction of Carbon Dioxide, Part II. The Mechanism of Reduction in Aprotic Solvents, J. Electroanal. Chem. 1989 (1985) 295-309, Elsevier Sequoia S.A., Lausanne—Printed in The Netherlands.
Vassiliev, Bagotzky, Khazova, and Mayorova; Electroreduction of Carbon Dioxide, Part I. The Mechanism and Kinetics of Electroreduction of CO2 in Aqueous Solutions on Metals with High and Moderate Hydrogen Overvoltages, J. Electroanal. Chem. 189 (1985) 271-294, Elsevier Sequoia S.A., Lausanne—Printed in the Netherlands.
Ikeda, Takagi, and Ito; Selective Formation of Formic Acid, Oxalic Acid, and Carbon Monoxide by Electrochemical Reduction of Carbon Dioxide, Bull. Chem. Soc. Jpn., 60, 2517-2522, Jul. 1987.

Shibata, Yoshida, and Furuya; Electrochemical Synthesis of Urea at Gas-Diffusion Electrodes, IV. Simultaneous Reduction of Carbon Dioxide and Nitrate Ions with Various Metal Catalysts; J. Electrochem. Soc., vol. 145, No. 7, Jul. 1998 The Electrochemical Society, Inc., pp. 2348-2353.
F. Richard Keene, Electrochemical and Electrocatalytic Reactions of Carbon Dioxide—Chapter 1: Thermodynamic, Kinetic, and Product Considerations in Carbon Dioxide Reactivity, Elsevier, Amsterdam, 1993, pp. 1-17.
Sammells and Cook, Electrochemical and Electrocatalytic Reactions of Carbon Dioxide—Chapter 7: Electrocatalysis and Novel Electrodes for High Rate CO2 Reduction Under Ambient Conditions, Elsevier, Amsterdam, 1993, pp. 217-262.
W.W. Frese, Jr., Electrochemical and Electrocatalytic Reactions of Carbon Dioxide—Chapter 6: Electrochemical Reduction of CO2 at Solid Electrodes, Elsevier, Amsterdam, 1993, pp. 145-215.
Halmann and Steinberg, Greenhouse gas carbon dioxide mitigation: science and technology—Chapter 11: Photochemical and Radiation-Induced Activation of CO2 in Homogeneous Media, CRC Press, 1999, pp. 391-410.
Halmann and Steinberg, Greenhouse gas carbon dioxide mitigation: science and technology—Chapter 13: Photoelectrochemical Reduction of CO2, CRC Press, 1999, pp. 517-527.
Colin Oloman and Hui Li, Electrochemical Processing of Carbon Dioxide, ChemSusChem 2008, 1, 385-391, Copyright 2008 Wiley-VCH Verlag GmbH& Co. KGaA, Weinheim, www.chemsuschem.org.
Hui Li and Colin Oloman, Development of a continuous reactor for the electro-reduction of carbon dioxide to formate—Part 1: Process variables, Journal of Applied Electrochemistry (2006) 36:1105-1115, Copyright Springer 2006.
Hui Li and Colin Oloman, Development of a continuous reactor for the electro-reduction of carbon dioxide to formate—Part 2: Scale-up, J Appl Electrochem (2007) 37:1107-1117.
Hui Li and Colin Oloman, The electro-reduction of carbon dioxide in a continuous reactor, Journal of Applied Electrochemistry (2005) 35:955-965, Copyright Springer 2005.
PCT International Search Report dated Dec. 13, 2011, PCT/US11/45515, 2 pages.
Andrew P. Doherty, Electrochemical reduction of butraldehyde in the presence of CO2, Electrochimica Acta 47 (2002) 2963-2967, Copyright 2002 Elsevier Science Ltd.
PCT International Search Report dated Dec. 15, 2011, PCT/US11/45521, 2 pages.
Fan et al., Semiconductor Electrodes. 27. The p- and n-GaAs-N, N?-Dimet h yl-4-4'-bipyridinum System. Enhancement of Hydrogen Evolution on p-GaAs and Stabilization of n-GaAs Electrodes, Journal of the American Chemical Society, vol. 102, Feb. 27, 1980, pp. 1488-1492.
PCT International Search Report dated Jun. 23, 2010, PCT/US10/22594, 2 pages.
Emily Barton Cole and Andrew B. Bocarsly, Carbon Dioxide as Chemical Feedstock, Chapter 11—Photochemical, Electrochemical, and Photoelectrochemical Reduction of Carbon Dioxide, Copyright 2010 Wiley-VCH Verlag GmbH & Col. KGaA, Weinheim, 26 pages.
Barton Cole, Lakkaraju, Rampulla, Morris, Abelev, and Bocarsly; Using a One-Electron Shuttle for the Multielectron Reduction of CO2 to Methanol: Kinetic, Mehcanistic, and Structural Insights; Mar. 29, 2919, 13 pages.
Morris, Mcgibbon, and Bocarsly; Electrocatalytic Carbon Dioxide Activation: the Rate-Determining Step of Pyridinium-Catalyzed CO2 Reduction; ChemicalSusChem 2011, 4, 191-196, Copyright 2011 Wiley-VCH Verlag GmbH& Co. KGaA, Weinheim.
Emily Barton Cole, Pyridinium-Catalyzed Electrochemical and Photoelectrochemical Conversion of CO2 to Fuels: A Dissertation Presented to the Faculty of Princeton University in Candidacy for the Degree of Doctor of Philosophy, Nov. 2009, pp. 1-141.
Barton, Rampulla, and Bocarsly; Selective Solar-Driven Reduction of CO2 to Methanol Using a Catalyzed pGaP Based Photoelectrochemical Cell; Oct. 3, 2007, 3 pages.
Mostafa Hossain, Nagaoka, and Ogura; Palladium and cobalt complexes of substituted quinoline, bipyridine and phenanthroline as

(56) References Cited

OTHER PUBLICATIONS catalysts for electrochemical reduction of carbon dioxide; Electrochimica Acta, vol. 42, No. 16, pp. 2577-2585, 1997.
Keene, Creutz, and Sutin; Reduction of Carbon Dioxide by Tris(2,2'-Bipyridine)Cobalt(I), Coordination Chemistry Reviews, 64 (1995) 247-260, Elsevier Science Publishers B.V., Amsterdam—Printed in The Netherlands.
Aurian-Blajeni, Halmann, and Manassen; Electrochemical Measurements on the Photoelectrochemical Reduction of Aqueous Carbon Dioxide on p-Gallium Phosphide and p-Gallium Arsenide Semiconductor Electrodes, Solar Energy Materials 8 (1983) 425-440, North-Holland Publishing Company.
Tan, Zou, and Hu; Photocatalytic reduction of carbon dioxide into gaseous hydrocarbon using TiO2 pellets; Catalysis Today 115 (2006) 269-273.
Bandi and Kuhne, Electrochemical Reduction of Carbon Dioxide in Water: Analysis of Reaction Mechanism on Ruthenium-Titanium-Oxide, J. Electrochem. Soc., vol. 139, No. 6, Jun. 1992 (C) The Electrochemical Society, Inc., pp. 1605-1610.
B. Beden, A. Bewick and C. Lamy, A Study by Electrochemically Modulated Infrared Reflectance Spectroscopy of the Electrosorption of Formic Acid At a Platinum Electrode, J. Electroanal. Chem., 148 (1983) 147-160, Elsevier Sequoia S.A., Lausanne—Printed in The Netherlands.
Bell and Evans, Kinetics of the Dehydration of Methylene Glycol in Aqueous Solution, Proceedings of the Royal Society of London, Series A, Mathematical and Physical Sciences, vol. 291, No. 1426 (Apr. 26, 1966), pp. 297-323.
Bian, Sumi, Furue, Sato, Kolke, and Ishitani; A Novel Tripodal Ligand, Tris[(4'-methyl-2,2'-bipyridyl-4-yl)-methyl]carbinol and Its Trinuclear RuII/ReI Mixed-Metal Complexes: Synthesis, Emission Properties, and Photocatalytic CO2 Reduction; Inorganic Chemistry, vol. 47, No. 23, 2008, pp. 10801-10803.
T. Bundgaard, H. J. Jakobsen, and E. J. Rahkamaa; A High-Resolution Investigation of Proton Coupled and Decoupled 13C FT NMR Spectra of 15N-Pyrrole; Journal of Magnetic Resonance 19,345-356 (1975).
D. Canfield and K. W. Frese, Jr, Reduction of Carbon Dioxide to Methanol on n- and p-GaAs and p-InP. Effect of Crystal Face, Electrolyte and Current Density, Journal of the Electrochemical Society, vol. 130, No. 8, Aug. 1983, pp. 1772-1773.
Arakawa, et al., Catalysis Research of Relevance to Carbon Management: Progress, Challenges, and Opportunities, Chem. Rev. 2001, 101, 953-996.
Chang, Ho, and Weaver; Applications of real-time infrared spectroscopy to electrocatalysis at bimetallic surfaces, I. Electrooxidation of formic acid and methanol on bismuth-modified Pt(111) and Pt(100), Surface Science 265 (1992) 81-94.
S. Clarke and J. A. Harrison, The Reduction of Formaldehyde, Electroanalytical Chemistry and Interfacial Electrochemistry, J. Electroanal. Chem., 36 (1972), pp. 109-115, Elsevier Sequoia S.A., Lausanne Printed in The Netherlands.
Li, Markley, Mohan, Rodriguez-Santiago, Thompson, and Van Niekerk; Utilization of Carbon Dioxide From Coal-Fired Power Plant for the Production of Value-Added Products; Apr. 27, 2006, 109 pages.
Stephen K. Ritter, What Can We Do With Carbon Dioxide? Scientists are trying to find ways to convert the plentiful greenhouse gas into fuels and other value-added products, Chemical & Engineering News, Apr. 30, 2007, vol. 85, No. 18, pp. 11-17, http://pubs.acs.org/cen/coverstory185/8518cover.html.
Toshio Tanaka, Molecular Orbital Studies on the Two-Electron Reduction of Carbon Dioxide to Give Formate Anion, Memoirs of Fukui University of Technology, vol. 23, Part 1, 1993, pp. 223-230.
Columbia, Crabtree, and Thiel; The Temperature and Coverage Dependences of Adsorbed Formic Acid and Its Conversion to Formate on Pt(111), J. Am. Chem. Soc., vol. 114, No. 4, 1992, pp. 1231-1237.
Brian R. Eggins and Joanne McNeill, Voltammetry of Carbon Dioxide, Part I. A General Survey of Voltammetry At Different Electrode Materials in Different Solvents, J. Electroanal. Chem., 148 (1983) 17-24, Elsevier Sequoia S.A., Lausanne—Printed in The Netherlands.
Varghese, Paulose, Latempa, and Grimes; High-Rate Solar Photocatalytic Conversion of CO2 and Water Vapor to Hydrocarbon Fuels; Nano Letters, 2009, vol. 9, No. 2, pp. 731-737.
Han, Chu, Kim, Song, and Kim; Photoelectron spectroscopy and ab initio study of mixed cluster anions of [(CO21-3(Pyridine)1-6: Formation of a covalently bonded anion core of (C5H5N-CO), Journal of Chemical Physics, vol. 113, No. 2, Jul. 8, 2000, pp. 596-601.
Heinze, Hempel, and Beckmann; Multielectron Storage and Photo-Induced Electron Transfer in Oligonuclear Complexes Containing Ruthenium(II) Terpyridine and Ferrocene Building Blocks, Eur. J. Inorg. Chem. 2006, 2040-2050.
Lin and Frei, Bimetallic redox sites for photochemical CO2 splitting in mesoporous silicate sieve, C. R. Chimie 9 (2006) 207-213.
Heyduk, MacIntosh, and Nocera; Four-Electron Photochemistry of Dirhodium Fluorophosphine Compounds, J. Am. Chem. Soc. 1999, 121, 5023-5032.
Witham, Huang, Tsung, Kuhn, Somorjai, and Toste; Converting homogeneous to heterogeneous in electrophilic catalysis using monodisperse metal nanoparticles, Nature Chemistry, DOI: 10.1038/NCHEM.468, pp. 1-6, 2009.
Hwang and Shaka, Water Suppression That Works. Excitation Sculpting Using Arbitrary Waveforms and Pulsed Field Gradients, Journal of Magnetic Resonance, Series A 112, 275-279 (1995).
Weissermel and Arpe, Industrial Organic Chemistry, 3rd Edition 1997, Published jointly by VCH Verlagsgesellchaft mbH, Weinheim (Federal Republic of Germany) VCH Pubiishers, Inc., New York, NY (USA), pp. 1-481.
Iwasita,. C. Nart, B. Lopez and W. Vielstich; on the Study of Adsorbed Species at Platinum from Methanol, Formic Acid and Reduced Carbon Dioxide via in situ FT-ir Spectroscopy, Electrochimica Acta, vol. 37. No. 12. pp. 2361-2367, 1992, Printed in Great Britain.
Lackner, Grimes, and Ziock; Capturing Carbon Dioxide From Air; pp. 1-15.
Kang, Kim, Lee, Hong, and Moon; Nickel-based tri-reforming catalyst for the production of synthesis gas, Applied Catalysis, A: General 332 (2007) 153-158.
Kostecki and Augustynski, Electrochemical Reduction of CO2 at an Activated Silver Electrode, Ber. Bunsenges. Phys. Chem. 98, 1510-1515 (1994) No. 12 C VCH Verlagsgesellschaft mbH, 0-69451 Weinheim, 1994.
Kunimatsu and Kita; Infrared Spectroscopic Study of Methanol and Formic Acid Adsorrates on a Platinum Electrode, Part II. Role of the Linear CO(a) Derived from Methanol and Formic Acid in the Electrocatalytic Oxidation of CH,OH and HCOOH, J Electroanal Chem., 218 (1987), Elsevler Sequoia S A, Lausanne—Printed in The Netherlands.
Lichter and Roberts, 15N Nuclear Magnetic Resonance Spectroscopy. XIII. Pyridine-15N1, Journal of the American Chemical Society 1 93:20 1 Oct. 6, 1971, pp. 5218-5224.
R.J.L. Martin, The Mechanism of the Cannizzaro Reaction of Formaldehyde, May 28, 1954, pp. 335-347.
Fujitani, Nakamura, Uchijima, and Nakamura; The kinetics and mechanism of methanol synthesis by hydrogenation of CO2 over a Zn-deposited Cu(111surface, Surface Science 383 (1997) 285-298.
Richard S. Nicholson and Irving Shain, Theory of Stationary Electrode Polarography, Single Scan and Cyclic Methods Applied to Reversible, Irreversible, and Kinetic Systems, Analytical Chemistry, vol. 36, No. 4, Apr. 1964, pp. 76-723.
Noda, Ikeda, Yamamoto, Einaga, and Ito; Kinetics of Electrochemical Reduction of Carbon Dioxide on a Gold Electrode in Phosphate Buffer Solutions; Bull. Chem. Soc. Jpn., 68, 1889-1895 (1995).
Joseph W. Ochterski, Thermochemistry in Gaussian, (c)2000, Gaussian, Inc., Jun. 2, 2000, 19 pages.
Kotaro Ogura and Mitsugu Takagi, Electrocatalytic Reduction of Carbon Dioxide to Methanol, Part IV. Assessment of the Current-Potential Curves Leading to Reduction, J. Electroanal. Chem., 206 (1986) 209-216, Elsevier Sequoia S.A., Lausanne—Printed in The Netherlands.

(56) References Cited

OTHER PUBLICATIONS

Ohkawa, Noguchi, Nakayama, Hashimoto, and Fujishima; Electrochemical reduction of carbon dioxide on hydrogen-storing materials, Part 3. The effect of the absorption of hydrogen on the palladium electrodes modified with copper; Journal of Electroanalytical Chemistry, 367 (1994) 165-173.
Ohmstead and Nicholson, Cyclic Voltammetry Theory for the Disproportionation Reaction and Spherical Diffusion, Analytical Chemistry, vol. 41, No. 6, May 1969, pp. 862-864.
Shunichi Fukuzumi, Bioinspired Energy Conversion Systems for Hydrogen Production and Storage, Eur. J. Inorg. Chem. 2008, 1339-1345.
Angamuthu, Byers, Lutz, Spek, and Bouwman; Electrocatalytic CO2 Conversion to Oxalate by a Copper Complex, Science, vol. 327, Jan. 15, 2010, pp. 313-315.
J. Fischer, Th. Lehmann, and E. Heitz; The production of oxalic acid from CO2 and H2O, Journal of Applied Electrochemistry 11 (1981) 743-750.
Rosenthal, Bachman, Dempsey, Esswein, Gray, Hodgkiss, Manke, Luckett, Pistorio, Veige, and Nocera; Oxygen and hydrogen photocatalysis by two-electron mixed-valence coordination compounds, Coordination Chemistry Reviews 249 (2005) 1316-1326.
Rudolph, Dautz, and Jager; Macrocyclic [N42-] Coordinated Nickel Complexes as Catalysts for the Formation of Oxalate by Electrochemical Reduction of Carbon Dioxide, J. Am. Chem. Soc. 2000, 122, 10821-10830.
D.A. Shirley, High-Resolution X-Ray Photoemission Spectrum of the Valence Bands of Gold, Physical Review B, vol. 5, No. 12, Jun. 15, 1972, pp. 4709-4714.
S.G. Sun and J. Clavilier, The Mechanism of Electrocatalytic Oxidation of Formic Acid on Pt (100) and Pt (111) in Sulphuric Acid Solution: an Emirs Study, J. Electroanal. Chem., 240 (1988) 147-159, Elsevier Sequoia S.A., Lausanne—Printed in The Netherlands.
Sun, Lin, Li, and Mu; Kinetics of dissociative adsorption of formic acid on Pt(100), Pt(610), Pt(210), and Pt(110) single-crystal electrodes in perchloric acid solutions, Journal of Electroanalytical Chemistry, 370 (1994) 273-280.
Marek Szklarczyk, Jerzy Sobkowski and Jolanta Pacocha, Adsorption and Reduction of Formic Acid on p-Type Silicon Electrodes, J. Electroanal. Chem., 215 (1986) 307-316, Elsevier Sequoia S.A., Lausanne—Printed in The Netherlands.
Zhao, Fan, and Wang, Photo-catalytic CO2 reduction using sol-gel derived titania-supported zinc-phthalocyanine, Journal of Cleaner Production 15 (2007) 1894-1897.
Tanaka and Ooyama, Multi-electron reduction of CO2 via Ru-CO2, -C(O)Oh, -CO, -CHO, and -CH2OH species, Coordination Chemistry Reviews 226 (2002) 211-218.
Toyohara, Nagao, Mizukawa, and Tanaka, Ruthenium Formyl Complexes as the Branch Point in Two- and Multi-Electron Reductions of CO2, Inorg. Chem. 1995, 34, 5399-5400.
Watanabe, Shibata, and Kato; Design of Ally Electrocatalysts for CO2 Reduction, III. The Selective and Reversible Reduction of CO2 on Cu Alloy Electrodes; J. Electrochem. Soc., vol. 138, No. 11, Nov. 1991, pp. 3382-3389.
Dr. Chao Lin, Electrode Surface Modification and its Application to Electrocatalysis, V. Catalytic Reduction of Carbon Dioxide to Methanol, Thesis, 1992, Princeton University, pp. 157-179.
Dr. Gayatri Seshadri, Part I. Electrocatalysis at modified semiconductor and metal electrodes; Part II. Electrochemistry of nickel and cadmium hexacyanoferrates, Chapter 2—The Electrocatalytic Reduction of CO2 to Methanol at Low Overpotentials, 1994, Princeton University, pp. 52-85.
Shibata et al., "Simultaneous Reduction of Carbon Dioxide and Nitrate Ions at Gas-Diffusion Electrodes with Various Metallophthalocyanine Catalysts", Electrochima Acta (no month, 2003), vol. 48, pp. 3953-3958.
Shibata et al., "Electrochemical Synthesis of Urea at Gas-Diffusion Electrodes", J. Electrochem. Soc. (Jul. 1998), vol. 145, No. 7, pp. 2348-2353.
Non-Final Office Action for U.S. Appl. No. 12/875,227, dated Dec. 11, 2012.
Seshadri et al, A New Homogeneous Electrocatalyst for the Reduction of Carbon Dioxide to Methanol at Low Overpotential, Journal of Electroanalytical Chemistry, 372 (1994), 145-50.
Green et al., Vapor-Liquid Equilibria of Formaldehyde-Methanol-Water, Industrial and Engineering Chemistry (Jan. 1955), vol. 47, No. 1, pp. 103-109.
Scibioh et al, Electrochemical Reduction of Carbon Dioxide: A Status Report, Proc Indian Natn Sci Acad (May 2004), vol. 70, A, No. 3, pp. 407-462.
Gennaro et al., Homogeneous Electron Transfer Catalysis of the Electrochemical Reduction of Carbon Dioxide. Do Aromatic Anion Radicals React in an Outer-Sphere Manner?, J. Am. Chem. Soc. (no month, 1996), vol. 118, pp. 7190-7196.
Perez et al., Activation of Carbon Dioxide by Bicyclic Amidines, J. Org. Chem. (no month, 2004), vol. 69, pp. 8005-8011.
Zaragoza Dorwald, Side Reactions in Organic Synthesis, 2005, Wiley-VCH Verlag GmbH & Co. KGaA, Weinheim, Preface. p. IX.
Liansheng et al, Journal of South Central University Technology, Electrode Selection of Electrolysis with Membrane for Sodium Tungstate Solution, 1999, 6(2), pp. 107-110.
Mahmood et al., Use of Gas-Diffusion Electrodes for High-Rate Electrochemical Reduction of Carbon Dioxide. II. Reduction at Metal Phthalocyanine-Impregnated Electrodes, J. of Appl. Electrochem. (no month, 1987), vol. 17, pp. 1223-1227.
Tanno et al., Electrolysis of Iodine Solution in a New Sodium Bicarbonate-Iodine Hybrid Cycle, International Journal of Hydrogen Energy (no month, 1984), vol. 9, No. 10, pp. 841-848.
Green et al., "Vapor-Liquid Equilibria of Formaldehyde-Methanol-Water", Industrial and Engineering Chemistry (Jan. 1955), vol. 47, No. 1, pp. 103-109.
Shibata et al., "Electrochemical Synthesis of Urea at Gas-Diffusion Electrodes Part VI. Simultaneous Reduction of Carbon Dioxide and Nitrite Ions with Various Metallophthalocyanine Catalysts". J. of Electroanalytical Chemistry (no month, 2001), vol. 507, pp. 177-184.
Jaaskelainen and Haukka, The Use of Carbon Dioxide in Ruthenium Carbonyl Catalyzed 1-hexene Hydroformylation Promoted by Alkali Metal and Alkaline Earth Salts, Applied Catalysis A: General, 247, 95-100 (2003).
Heldebrant et al., "Reversible Zwitterionic Liquids, The Reaction of Alkanol Guanidines, Alkanol Amidines, and Diamines wih CO2", Green Chem. (mo month, 2010), vol. 12, pp. 713-721.
Perez et al., "Activation of Carbon Dioxide by Bicyclic Amidines", J. Org. Chem. (no month, 2004), vol. 69, pp. 8005-8011.
Seshardi G., Lin C., Bocarsly A.B., A new homogeneous electrocatalyst for the reduction of carbon dioxide to methanol at low overpotential, Journal of Electroanalytical Chemistry, 1994, 372, pp. 145-150.

\* cited by examiner

US 8,568,581 B2

HETEROCYCLE CATALYZED CARBONYLATION AND HYDROFORMYLATION WITH CARBON DIOXIDE

CROSS-REFERENCE TO RELATED APPLICATIONS

The present application claims the benefit under 35 U.S.C. §119(e) of the following applications:

U.S. Patent Application Ser. No. 61/417,956, entitled "Heterocycle Catalyzed Carbonylation with Carbon Dioxide," filed Nov. 30, 2010.

U.S. Patent Application Ser. No. 61/418,054, entitled "Heterocycle Catalyzed Hydroformylation with Carbon Dioxide," filed Nov. 30, 2010.

Each of the above-listed applications is hereby incorporated by reference in their entireties.

FIELD

The present disclosure generally relates to the field of electrochemical reactions, and more particularly to methods and/or systems for heterocycle catalyzed carbonylation and hydroformylation with carbon dioxide.

BACKGROUND

The combustion of fossil fuels in activities such as electricity generation, transportation, and manufacturing produces billions of tons of carbon dioxide annually. Research since the 1970s indicates increasing concentrations of carbon dioxide in the atmosphere may be responsible for altering the Earth's climate, changing the pH of the ocean and other potentially damaging effects. Countries around the world, including the United States, are seeking ways to mitigate emissions of carbon dioxide.

A mechanism for mitigating emissions is to convert carbon dioxide into economically valuable materials such as fuels and industrial chemicals. If the carbon dioxide is converted using energy from renewable sources, both mitigation of carbon dioxide emissions and conversion of renewable energy into a chemical form that can be stored for later use will be possible.

However, the field of electrochemical techniques attempting to utilize carbon dioxide as a reactant to form chemical products has many limitations, including the stability of systems used in the process, the efficiency of systems, the selectivity of the systems or processes for a desired chemical, the cost of materials used in systems/processes, the ability to control the processes effectively, and the rate at which carbon dioxide is converted. In particular, existing electrochemical and photochemical processes/systems have one or more of the following problems that prevent commercialization on a large scale. Several processes utilize metals, such as ruthenium or gold, that are rare and expensive. In other processes, organic solvents were used that made scaling the process difficult because of the costs and availability of the solvents, such as dimethyl sulfoxide, acetonitrile, and propylene carbonate. Copper, silver and gold have been found to reduce carbon dioxide to various products, however, the electrodes are quickly "poisoned" by undesirable reactions on the electrode and often cease to work in less than an hour. Similarly, gallium-based semiconductors reduce carbon dioxide, but rapidly dissolve in water. Many cathodes produce a mixture of organic products. For instance, copper produces a mixture of gases and liquids including carbon monoxide, methane, formic acid, ethylene, and ethanol. Such mixtures of products make extraction and purification of the products costly and can result in undesirable waste products that must be disposed. Much of the work done to date on carbon dioxide reduction is inefficient because of high electrical potentials utilized, low faradaic yields of desired products, and/or high pressure operation. The energy consumed for reducing carbon dioxide thus becomes prohibitive. Many conventional carbon dioxide reduction techniques have very low rates of reaction. For example, in order to provide economic feasibility, a commercial system currently may require densities in excess of 100 milliamperes per centimeter squared (mA/$cm^2$), while rates achieved in the laboratory are orders of magnitude less.

SUMMARY

A method for mitigation of carbon dioxide through heterocycle catalyzed hydroformylation using carbon dioxide may include, but is not limited to, steps (A) to (D). Step (A) may introduce water to a first compartment of an electrochemical cell. The first compartment may include an anode. Step (B) may introduce carbon dioxide to a second compartment of the electrochemical cell. The second compartment may include a solution of an electrolyte, a heterocyclic catalyst, and a cathode. Step (C) may introduce an alkene to the second compartment of the electrochemical cell. Step (D) may apply an electrical potential between the anode and the cathode in the electrochemical cell sufficient to induce liquid phase hydroformylation to form a product mixture.

A method for mitigation of carbon dioxide through heterocycle catalyzed carbonylation using carbon dioxide may include, but is not limited to, steps (A) to (D). Step (A) may introduce water to a first compartment of an electrochemical cell. The first compartment may include an anode. Step (B) may introduce carbon dioxide to a second compartment of the electrochemical cell. The second compartment may include a solution of an electrolyte, a heterocyclic catalyst, and a cathode. Step (C) may introduce at least one of a carboxylic acid, an aldehyde, an alcohol, acetylene, an amine, an aromatic compound, or an epoxide to the second compartment of the electrochemical cell. Step (D) may apply an electrical potential between the anode and the cathode in the electrochemical cell sufficient to induce liquid phase carbonylation to form a product mixture.

A system may include, but is not limited to, an electrochemical cell including a first cell compartment, an anode positioned within the first cell compartment, a second cell compartment, a separator interposed between the first cell compartment and the second cell compartment, and a cathode and a heterocyclic catalyst positioned within the second cell compartment. The system may also include a carbon dioxide source, where the carbon dioxide source may be coupled with the second cell compartment and may be configured to supply carbon dioxide to the cathode. The system may also include a reactant source coupled with the second cell compartment. The reactant source may be configured to supply at least one of an alkene, a carboxylic acid, an aldehyde, an alcohol, acetylene, an amine, an aromatic compound, or an epoxide to the cathode. The system may also include a fluid source coupled with the first cell compartment. The system may further include an energy source operably coupled with the anode and the cathode. The energy source may be configured to provide power to the anode and the cathode to induce at least one of hydroformylation or carbonylation at the cathode and to oxidize the fluid at the anode.

It is to be understood that both the foregoing general description and the following detailed description are exemplary and explanatory only and are not necessarily restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which.

DETAILED DESCRIPTION

Figure 1:
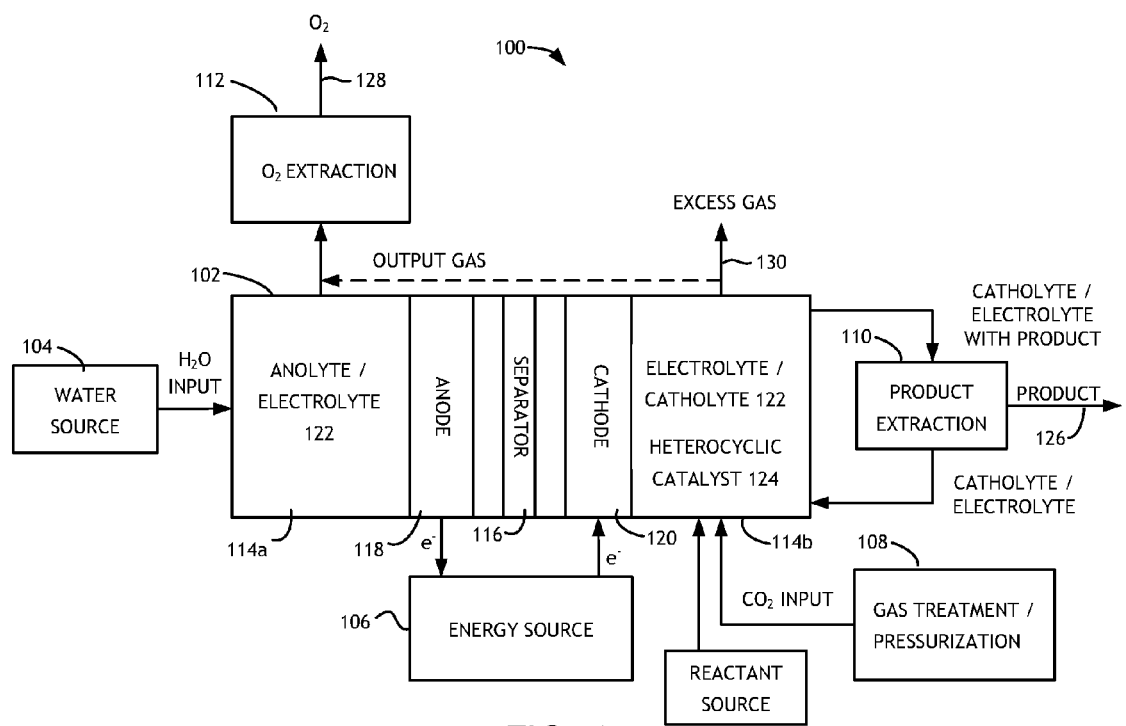
FIG. 1 is a block diagram of a system in accordance with an embodiment of the present disclosure.

Reference will now be made in detail to the presently preferred embodiments of the present disclosure, examples of which are illustrated in the accompanying drawings.

In accordance with some embodiments of the present disclosure, an electrochemical system is provided that generally allows carbon dioxide and water to undergo hydroformylation to produce commercially valuable products under mild process conditions. In accordance with some embodiments of the present disclosure, an electrochemical system is provided that generally allows carbon dioxide to participate in carbonylation with another reactant to produce commercially valuable products under mild process conditions.

Aldehydes are an important industrial chemical, and are industrially produced via hydroformylation using alkenes (olefins) and syngas as reactants. More than nine million metric tons of aldehydes are produced annually using hydroformylation. The alkenes used in hydroformylation may be produced via catalytic cracking of petroleum. The syngas may be produced via steam reformation of natural gas.

Other useful industrial chemicals, including organic acids, alcohols, carbonates, and the like, may be industrially produced via carbonylation using carbon monoxide (e.g., from syngas) and a variety of other materials as reactants. Such other materials used as reactants with carbon monoxide may include acetylene, amines, nitro compounds, aromatics, alcohols, and cyclic molecules. Current carbonylation processes include the Monsanto and Cativa Processes for making acetic acid from methanol, Reppe Chemistry, the Koch Reaction, and carboxylation. Conventional carbonylation processes generally occur at high pressure and temperature, depending on the desired product. Further, conventional carbonylation processes produce carbon dioxide, thereby further contributing to the concentration of carbon dioxide in the atmosphere and thus, global climate change.

In some embodiments of the present disclosure, the energy used by the systems may be generated from an alternative energy source to avoid generation of additional carbon dioxide through combustion of fossil fuels. In general, the embodiments for carbon dioxide to participate as a reactant in hydroformylation and carbonylation do not require syngas as reactants. Some embodiments of the present invention thus relate to environmentally beneficial methods and systems for reducing carbon dioxide, a major greenhouse gas, in the atmosphere thereby leading to the mitigation of global warming. The embodiments provided herein also promote safety by utilizing relatively mild process conditions that do not rely on high pressure/high temperature process conditions. Moreover, certain processes herein are preferred over existing electrochemical processes due to being stable, efficient, having scalable reaction rates, occurring in water, and providing selectivity of desired products.

For electrochemical reductions, the electrode may be a suitable conductive electrode, such as Al, Au, Ag, C, Cd, Co, Cr, Cu, Cu alloys (e.g., brass and bronze), Ga, Hg, In, Mo, Nb, Ni, Ni alloys, Ni—Fe alloys, Sn, Sn alloys, Ti, V, W, Zn, stainless steel (SS), austenitic steel, ferritic steel, duplex steel, martensitic steel, Nichrome, elgiloy (e.g., Co—Ni—Cr), degenerately doped n-Si, degenerately doped n-Si:As and degenerately doped n-Si:B. Other conductive electrodes may be implemented to meet the criteria of a particular application. For photoelectrochemical reductions, the electrode may be a p-type semiconductor, such as p-GaAs, p-GaP, p-InN, p-InP, p-CdTe, p-GaInP$_2$ and p-Si. Other semiconductor electrodes may be implemented to meet the criteria of a particular application.

Before any embodiments of the invention are explained in detail, it is to be understood that the embodiments may not be limited in application per the details of the structure or the function as set forth in the following descriptions or illustrated in the figures of the drawing. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage.

A use of electrochemical or photoelectrochemical reactions involving carbon dioxide as a reactant, tailored with certain electrocatalysts, may produce commercially valuable chemicals and other products. The reaction of the carbon dioxide may be suitably achieved efficiently in a divided electrochemical or photoelectrochemical cell in which (i) a compartment contains an anode suitable to oxidize or split the water, and (ii) another compartment contains a working cathode electrode and a catalyst. The compartments may be separated by a porous glass frit, microporous separator, ion exchange membrane, or other ion conducting bridge. Both compartments generally contain an aqueous solution of an electrolyte. Carbon dioxide gas may be continuously bubbled through the cathodic electrolyte solution to saturate the solution.

Advantageously, the carbon dioxide may be obtained from any source (e.g., an exhaust stream from fossil-fuel burning power or industrial plants, from geothermal or natural gas wells or the atmosphere itself). Most suitably, the carbon dioxide may be obtained from concentrated point sources of generation prior to being released into the atmosphere. For example, high concentration carbon dioxide sources may frequently accompany natural gas in amounts of 5% to 50%, exist in flue gases of fossil fuel (e.g., coal, natural gas, oil, etc.) burning power plants, and high purity carbon dioxide may be exhausted from cement factories, from fermenters used for industrial fermentation of ethanol, and from the manufacture of chemicals and fertilizers. Certain geothermal steams may also contain significant amounts of carbon dioxide. The carbon dioxide emissions from varied industries, including geothermal wells, may be captured on-site. Separation of the carbon dioxide from such exhausts is known. Thus, the capture and use of existing atmospheric carbon dioxide in accordance with some embodiments of the present invention generally allow the carbon dioxide to be a renewable and unlimited source of carbon.

Referring to FIG. 1, a block diagram of a system 100 is shown in accordance with a specific embodiment of the present invention. System 100 may be utilized for carbonylation and/or hydroformylation with carbon dioxide, depending on whether other reactants are introduced with the carbon dioxide. The system (or apparatus) 100 generally comprises a cell (or container) 102, a liquid source 104, a power source 106, a gas source 108, a first extractor 110 and a second extractor 112. A product or product mixture may be presented from the first extractor 110. An output gas may be presented from the second extractor 112.

The cell 102 may be implemented as a divided cell. The divided cell may be a divided electrochemical cell and/or a divided photochemical cell. The cell 102 is generally operational to process carbon dioxide ($CO_2$) into products via hydroformylation and/or carbonylation. The reaction may take place by bubbling carbon dioxide and an aqueous solution of an electrolyte in the cell 102. A cathode 120 in the cell 102 may induce hydroformylation and/or carbonylation with the carbon dioxide into a product mixture that may include one or more compounds. For hydroformylation processes, the product mixture may include one or more aldehydes. For carbonylation processes, the product mixture may include one or more organic acids, aldehydes, alcohols, carbonates, and/or cyclic species.

The cell 102 generally comprises two or more compartments (or chambers) 114a-114b, a separator (or membrane) 116, an anode 118, and a cathode 120. The anode 118 may be disposed in a given compartment (e.g., 114a). The cathode 120 may be disposed in another compartment (e.g., 114b) on an opposite side of the separator 116 as the anode 118. An aqueous solution 122 may fill both compartments 114a-114b. The aqueous solution 122 may include water as a solvent and water soluble salts (e.g., potassium chloride (KCl), potassium sulfate ($K_2SO_4$), or other suitable salt). A heterocyclic catalyst 124 may be added to the compartment 114b containing the cathode 120.

The liquid source 104 may implement a water source. The liquid source 104 may be operational to provide pure water to the cell 102.

The power source 106 may implement a variable voltage source. The power source 106 may be operational to generate an electrical potential between the anode 118 and the cathode 120. The electrical potential may be a DC voltage.

The gas source 108 may implement a carbon dioxide source. The source 108 is generally operational to provide carbon dioxide to the cell 102. In some embodiments, the carbon dioxide is bubbled directly into the compartment 114b containing the cathode 120.

The first extractor 110 may implement an organic product and/or inorganic product extractor. The extractor 110 is generally operational to extract (separate) one or products of the product mixture from the electrolyte 122. The extracted products may be presented through a port 126 of the system 100 for subsequent storage and/or consumption by other devices and/or processes.

The second extractor 112 may implement an oxygen extractor. The second extractor 112 is generally operational to extract oxygen (e.g., $O_2$) byproducts created by the reduction of the carbon dioxide and/or the oxidation of water. The extracted oxygen may be presented through a port 128 of the system 100 for subsequent storage and/or consumption by other devices and/or processes. Chlorine and/or oxidatively evolved chemicals may also be byproducts in some configurations, such as in an embodiment of processes other than oxygen evolution occurring at the anode 118. Such processes may include chlorine evolution, oxidation of organics, and corrosion of a sacrificial anode. Any other excess gases (e.g., hydrogen) created by the reduction of the carbon dioxide and water may be vented from the cell 102 via a port 130.

In the hydroformylation and/or carbonylation processes, water may be oxidized (or split) to protons and oxygen at the anode 118 while the carbon dioxide is reduced to the product mixture at the cathode 120. The electrolyte 122 in the cell 102 may use water as a solvent with any salts that are water soluble, including potassium chloride (KCl) and potassium sulfate ($K_2SO_4$) and with a suitable heterocyclic catalyst 124, such as imidazole, pyridine, or any substituted variant with one or more 5- or 6-member heterocyclic ring. In general, at least 1% water of a total amount of liquid in the cathode compartment solution should be present in order to provide sufficient protons for the desired reaction (e.g., hydroformylation and/or carbonylation) to occur. Cathode materials generally include any conductor. However, efficiency of the process may be selectively increased by employing a catalyst/cathode combination selective for a hydroformylation and/or carbonylation with carbon dioxide to a product mixture. For catalytic reduction of carbon dioxide, the cathode materials may include Sn, Ag, Cu, Rh, Fe, Co, In, steel (e.g., 316 stainless steel), and alloys of Co, Cu, and Ni. The materials may be in bulk form. Additionally and/or alternatively, the materials may be present as particles or nanoparticles loaded onto a substrate, such as graphite, carbon fiber, or other conductor.

An anode material sufficient to oxidize or split water may be used. The overall process may be generally driven by the power source 106. Combinations of cathodes 120, electrolytes 122, and heterocyclic catalysts 124 may be used to control the reaction products of the cell 102.

For hydroformylation processes, carbon dioxide is introduced to the cathode 120 in the compartment 114b. For instance, carbon dioxide may be bubbled into the compartment 114b. An alkene is also introduced to the compartment 114b, such as from a reactant source. The alkene may include, for example, ethylene, propylene, 1-butylene, 2-butylene, butadiene, 3-buten-1-ol, an allyl alcohol, an unsaturated alcohol, or an unsaturated organic reactant. A metallic or nonmetallic cathode in the compartment 114b may be sustained at an electric potential of between approximately −0.5 and −2V vs. SCE (saturated calomel electrode) in order to drive the hydroformylation with the aid of the heterocyclic catalyst 124. The reaction may occur at mild process conditions, for example, at ambient temperature and pressure.

The reaction process for hydroformylation in the electrochemical cell 102 may involve the heterocyclic catalyst 124, available protons, and the cathode 120 interacting to form a radical, as described in U.S. patent application Ser. No. 12/696,840, entitled "Conversion of Carbon Dioxide to Organic Products," which is hereby incorporated by reference. The radical formed by the interaction of the heterocyclic catalyst 124, available protons, and the cathode 120 may react with carbon dioxide to produce a hydroxy formyl radical. The carbon dioxide is thus activated and available to react with the alkene present in the compartment 114b. The formyl radical and the alkene may react in a manner analogous to hydroformylation to produce a product mixture. The product mixture may include one or more of a carboxylic acid, an aldehyde, or an alcohol, depending on the cathode material, the heterocyclic catalyst 124, and the reaction conditions of the cell 102. In other embodiments, the product mixture may include one or more of a hydroxy aldehyde, a hydroxy carboxylic acid, or a diol if an allyl alcohol or 3-buten-1-ol is used as the alkene reactant. Metal oxide catalysts may be added to the compartment 114b to accelerate the reaction and/or to improve selectivity of a desired product.

For carbonylation processes, carbon dioxide is introduced to the cathode 120 in the compartment 114b. For instance, carbon dioxide may be bubbled into the compartment 114b. A second reactant is also introduced to the compartment 114b, such as from a reactant source. The second reactant may include, for example, a carboxylic acid, an aldehyde, an alcohol, acetylene, an amine, an aromatic compound, or an epoxide. A metallic or non-metallic cathode in the compartment 114b may be sustained at an electric potential of between approximately −0.5 and −2V vs. SCE (saturated calomel electrode) in order to drive the carbonylation with the aid of the heterocyclic catalyst 124. The reaction may occur at mild process conditions, for example, at ambient temperature and pressure.

The reaction process for carbonylation in the electrochemical cell 102 may involve two pathways. In the first, the heterocyclic catalyst 124, available protons, and the cathode 120 interacting to form a radical, as described in U.S. patent application Ser. No. 12/696,840, entitled "Conversion of Carbon Dioxide to Organic Products," which is incorporated by reference. The radical formed by the interaction of the heterocyclic catalyst 124, available protons, and the cathode 120 may react with carbon dioxide to produce a hydroxy formyl radical. The carbon dioxide is thus activated and available to react with the second reactant present in the compartment 114b. The formyl radical and the second reactant may react in a manner analogous to carbonylation to produce a product mixture.

In the second pathway, the carbon dioxide in compartment 114b may be reduced to carbon monoxide (CO) at the cathode 120. The carbon monoxide may react with the second reactant present in the compartment 114b to form the carbonylation product mixture. The product mixture under either pathway may include one or more organic acid, aldehyde, alcohol, carbonate, cyclic compound, or a combination thereof. Metal oxide catalysts may be added to the compartment 114b to accelerate the reaction and/or to improve selectivity of a desired product.

As described herein, the present disclosure may be implemented via an electrochemical cell wherein carbon dioxide and another reactant is processed to form a product mixture. For hydroformylation, the other reactant may include an alkene. For carbonylation, the other reactant may include, for example, a carboxylic acid, an aldehyde, an alcohol, acetylene, an amine, an aromatic compound, or an epoxide. For hydroformylation and for carbonylation, additional metal oxide or metal reaction promoters may be added to the catholyte to improve the kinetics and/or selectivity of the process.

Figure 2:
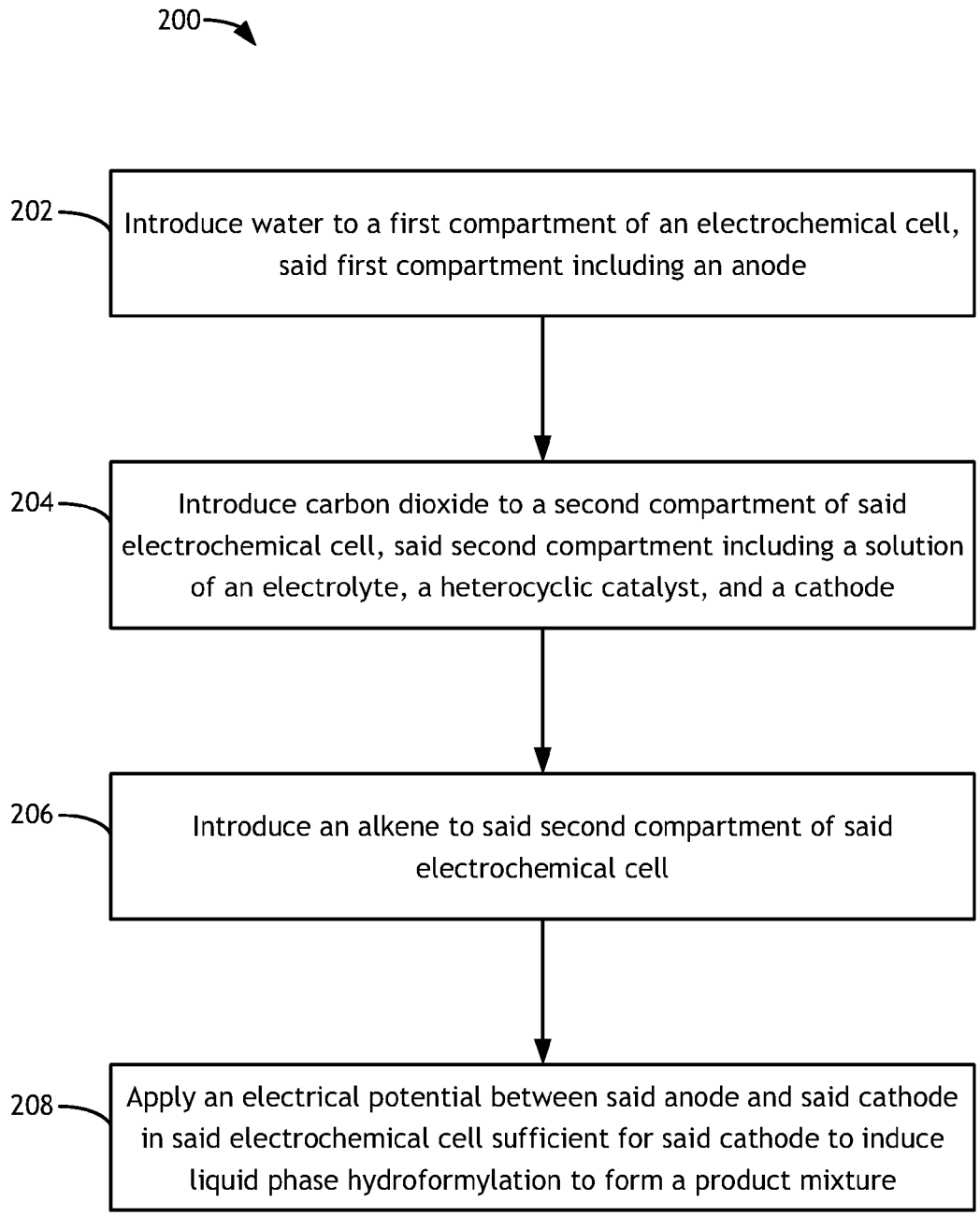
FIG. 2 is a flow diagram of an example method for mitigation of carbon dioxide through heterocycle catalyzed hydroformylation using carbon dioxide.

Referring to FIG. 2, a flow diagram of an example method 200 for hydroformylation with carbon dioxide is shown. The method (or process) 200 generally comprises a step (or block) 202, a step (or block) 204, a step (or block) 206, and a step (or block) 208. The method 200 may be implemented using the system 100.

In the step 202, water may be introduced to a first compartment of an electrochemical cell. The first compartment may include an anode. Introducing carbon dioxide to a second compartment of the electrochemical cell may be performed in the step 204. The second compartment may include a solution of an electrolyte, a heterocyclic catalyst, and a cathode. In the step 206, an alkene may be introduced to the second compartment of the electrochemical cell. In the step 208, an electric potential may be applied between the anode and the cathode in the electrochemical cell sufficient for the cathode to induce liquid phase hydroformylation to form a product mixture.

Figure 3:
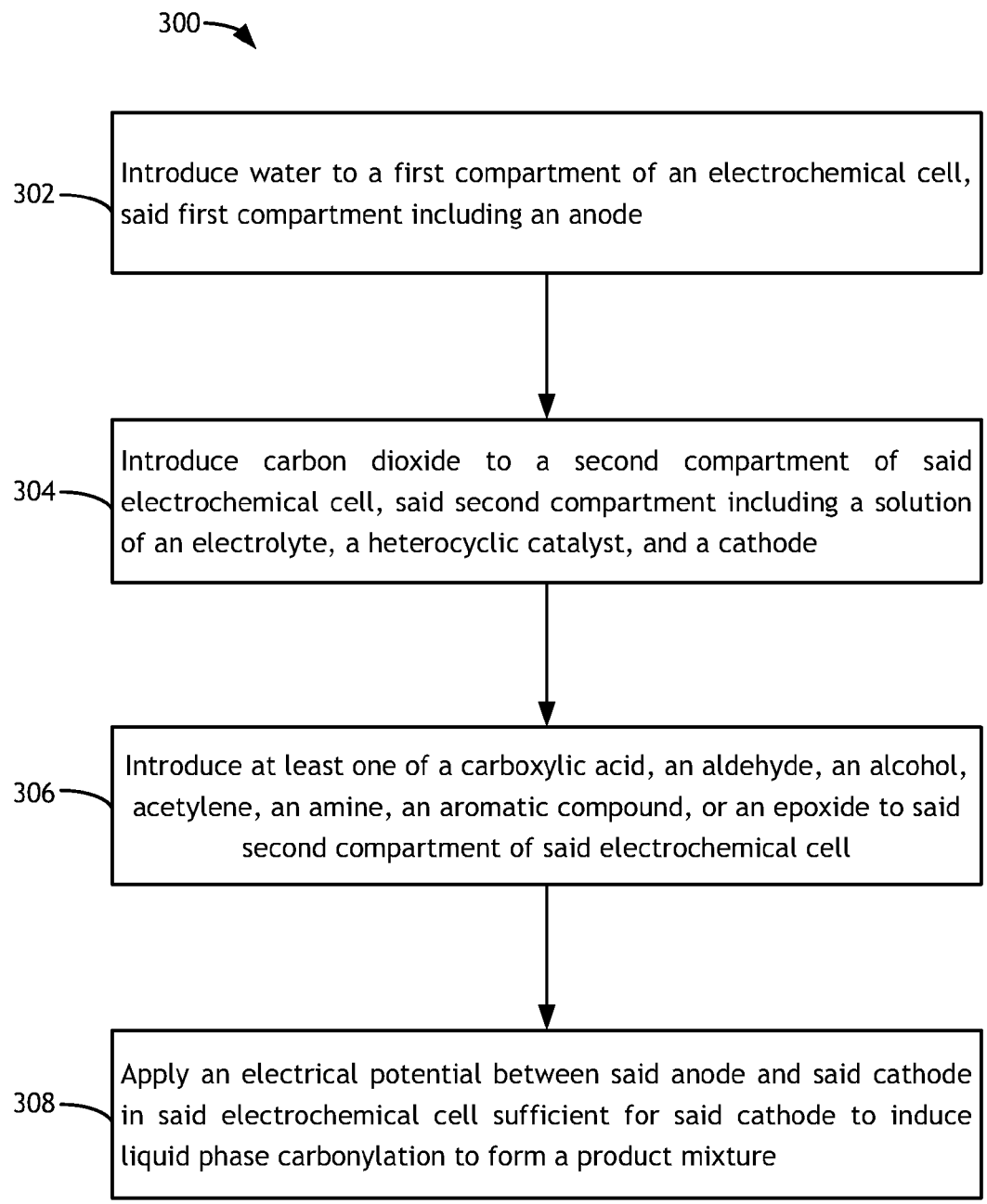
FIG. 3 is a flow diagram of an example method for mitigation of carbon dioxide through heterocycle catalyzed carbonylation using carbon dioxide.

Referring to FIG. 3, a flow diagram of an example method 300 for carbonylation with carbon dioxide is shown. The method (or process) 300 generally comprises a step (or block) 302, a step (or block) 304, a step (or block) 306, and a step (or block) 308. The method 300 may be implemented using the system 100.

In the step 302, water may be introduced to a first compartment of an electrochemical cell. The first compartment may include an anode. Introducing carbon dioxide to a second compartment of the electrochemical cell may be performed in the step 304. The second compartment may include a solution of an electrolyte, a heterocyclic catalyst, and a cathode. In the step 306, at least one of a carboxylic acid, an aldehyde, an alcohol, acetylene, an amine, an aromatic compound, or an epoxide may be introduced to the second compartment of the electrochemical cell. In the step 308, an electric potential may be applied between the anode and the cathode in the electrochemical cell sufficient for the cathode to induce liquid phase carbonylation to form a product mixture.

EXAMPLE 1

Hydroformylation

The hydroformylation of allyl alcohol with carbon dioxide was performed electrochemically using pyridine as a homogenous catalyst. The project was aimed at the carbon-carbon coupling of pyridine catalyzed formyl/carboxyl/carbamate to the surface bound alkene group of the reactant. The reaction was conducted with a cobalt cathode. The cathode was held at −1V vs SCE using a potentiostat. 0.5M potassium chloride was used as the electrolyte, with water as the solvent for the reaction. Allyl alcohol was in solution in the cathode compartment and carbon dioxide was bubbled through the solution during electrolysis. The anode compartment also contained water with potassium sulfate electrolyte and a water oxidation anode manufactured by De Nora. In the case of cobalt cathodes, aldehyde product indicative of hydroformylation of the allyl alcohol was observed using 1H NMR analysis.

EXAMPLE 2

Hydroformylation

In another investigation, similar reaction was performed with a cobalt cathode using 3-buten-1-ol instead of the allyl alcohol. As similar to allyl alcohol studies an aldehyde product was observed using 1H NMR.

EXAMPLE 3

Carbonylation

Carbonylation of glyoxal was conducted with carbon dioxide in an electrochemical reactor. The cathode material was indium. The anode was a water oxidation anode manufactured by De Nora. The catholyte consisted of 0.5M potassium chloride and pyridine heterocycle catalyst in water with glyoxal in solution and carbon dioxide bubbled through the cathode compartment. The anolyte consisted of 0.5M potassium sulfate in water. The cathode was held at −1.46V vs SCE using a potentiostat. Three carbon products, to include propanal and acetone were observed using 1H NMR, demonstrating the reductive carbonylation of glyoxal with carbon dioxide.

It is believed that the present disclosure and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A method for hydroformylation with carbon dioxide, comprising:
   (A) introducing water to a first compartment of an electrochemical cell, said first compartment including an anode;
   (B) introducing carbon dioxide to a second compartment of said electrochemical cell, said second compartment including a solution of an electrolyte, a heterocyclic catalyst, and a cathode;
   (C) introducing an alkene to said second compartment of said electrochemical cell; and
   (D) applying an electrical potential between said anode and said cathode in said electrochemical cell sufficient for said cathode to induce liquid phase hydroformylation to form a product mixture.

2. The method of claim 1, wherein said product mixture includes at least one of a carboxylic acid, an aldehyde, or an alcohol.

3. The method of claim 1, wherein said solution of said electrolyte includes at least one of potassium chloride or potassium sulfate.

4. The method of claim 1, where said heterocyclic catalyst includes at least one of imidazole, pyridine, or a substituted variant of imidazole or pyridine, said substituted variant including at least one of a five member heterocyclic ring or a six member heterocyclic ring.

5. The method of claim 1, wherein said second compartment further includes a metal oxide reaction promoter.

6. The method of claim 1, wherein said alkene includes at least one of ethylene, propylene, 1-butylene, 2-butylene, butadiene, an unsaturated alcohol, or an unsaturated organic reactant.

7. The method of claim 1, wherein applying an electrical potential between said anode and said cathode in said electrochemical cell includes:
   applying a potential of between approximately −0.5 and −2V vs. SCE (saturated calomel electrode) at said cathode.

8. The method of claim 1, wherein applying an electrical potential between said anode and said cathode in said electrochemical cell includes:
   applying an electrical potential between said anode and said cathode in said electrochemical cell at ambient temperature and pressure.

9. The method of claim 1, wherein said second compartment further includes at least one percent water of a total amount of liquid in said second compartment.

* * * * *